US011015722B2

(12) United States Patent
Balkenhol et al.

(10) Patent No.: US 11,015,722 B2
(45) Date of Patent: May 25, 2021

(54) SAFETY VALVE

(71) Applicant: GEA Farm Technologies GmbH, Bönen (DE)

(72) Inventors: Reinhard Balkenhol, Paderborn (DE); Magnus Wiethoff, Welver (DE); Verena Figgener, Oelde (DE)

(73) Assignee: GEA Farm Technologies GmbH, Bönen (DE)

( * ) Notice: Subject to any disclaimer, the term of this patent is extended or adjusted under 35 U.S.C. 154(b) by 73 days.

(21) Appl. No.: 16/098,315

(22) PCT Filed: Apr. 28, 2017

(86) PCT No.: PCT/EP2017/060232
§ 371 (c)(1),
(2) Date: Nov. 1, 2018

(87) PCT Pub. No.: WO2017/191057
PCT Pub. Date: Nov. 9, 2017

(65) Prior Publication Data
US 2019/0145531 A1 May 16, 2019

(30) Foreign Application Priority Data
May 4, 2016 (DE) .................... 10 2016 108 300.3

(51) Int. Cl.
*F16K 11/044* (2006.01)
*A01J 7/02* (2006.01)
(Continued)

(52) U.S. Cl.
CPC ............... *F16K 11/044* (2013.01); *A01J 5/04* (2013.01); *A01J 5/044* (2013.01); *A01J 7/02* (2013.01);
(Continued)

(58) Field of Classification Search
CPC ............... F16K 11/044; F16K 31/1221; F16K 37/0033; A01J 7/02; Y10T 137/86879
(Continued)

(56) References Cited

U.S. PATENT DOCUMENTS

| 1,365,665 A | 1/1921 | Davies |
| 2,012,031 A | 8/1935 | Woodruff |

(Continued)

FOREIGN PATENT DOCUMENTS

| AU | 641229 | 9/1993 |
| AU | 2013294747 B2 | 11/2016 |

(Continued)

OTHER PUBLICATIONS

"Grade A pasteurized milk ordinance" 2003 Revision; US Department Health and Human Services, Public Health Service; Food and Drug Administration.
(Continued)

*Primary Examiner* — Michael R Reid
(74) *Attorney, Agent, or Firm* — Smith Law Office; Jeffry W. Smith

(57) ABSTRACT

A safety valve for a cleaning device for a milking installation for milking milk-providing animals, including a first block valve with an input, a second block valve with an output, a bleed valve with a bleed output, a piston rod and a drive unit, wherein the safety valve is movable from a blocking position, in which the first block valve and the second block valve are closed in order to block the input and the output and in which the bleed valve is opened in order to connect the bleed output to a connection, into a pass-through position, in which the first block valve and the second block valve are opened in order to connect the input to the output via the connection and in which the bleed valve is closed in order to block the bleed output, and back. The first block
(Continued)

valve, the second block valve and the bleed valve of the safety valve are designed as seat valves with a common piston plate.

21 Claims, 11 Drawing Sheets

(51) Int. Cl.
 *A01J 5/04* (2006.01)
 *F16K 31/122* (2006.01)
 *F16K 37/00* (2006.01)

(52) U.S. Cl.
 CPC ...... *F16K 31/1221* (2013.01); *F16K 37/0033* (2013.01)

(58) Field of Classification Search
 USPC .................................................... 137/625.48
 See application file for complete search history.

(56) References Cited

U.S. PATENT DOCUMENTS

| | | | |
|---|---|---|---|
| 2,532,088 A | 11/1950 | Cordis | |
| 2,747,544 A | 5/1956 | Thomas | |
| 3,014,455 A | 12/1961 | Olander | |
| 3,099,246 A | 7/1963 | Beskow | |
| 3,119,401 A | 1/1964 | Merritt et al. | |
| 3,285,297 A | 11/1966 | Duft et al. | |
| 3,417,763 A | 12/1968 | Fjermestad et al. | |
| 3,461,845 A | 8/1969 | Peterson | |
| 3,474,760 A | 10/1969 | Siddall et al. | |
| 3,482,547 A | 12/1969 | Maier | |
| 3,500,839 A | 3/1970 | Bender | |
| 3,630,081 A | 12/1971 | Nelson | |
| 3,648,696 A | 3/1972 | Keith | |
| 3,688,783 A | 9/1972 | Owens | |
| 3,696,790 A | 10/1972 | Albright | |
| 3,713,423 A | 1/1973 | Sparr, Sr. | |
| 3,726,253 A | 4/1973 | Duncan | |
| 3,762,371 A | 10/1973 | Quayle et al. | |
| 3,789,798 A | 2/1974 | Reisgies et al. | |
| 3,797,525 A | 3/1974 | Lieser | |
| 3,861,335 A | 1/1975 | Przewalski | |
| 3,861,355 A | 1/1975 | Johnson et al. | |
| 3,957,018 A | 5/1976 | Barrett | |
| 3,971,512 A | 7/1976 | Duncan | |
| 3,973,520 A | 8/1976 | Flocchini | |
| 3,989,009 A | 11/1976 | Robar et al. | |
| 4,034,714 A | 7/1977 | Umbaugh et al. | |
| 4,061,504 A | 12/1977 | Zall et al. | |
| 4,149,489 A | 4/1979 | Umbaugh et al. | |
| 4,168,677 A | 9/1979 | Brown | |
| 4,175,514 A | 11/1979 | Souza et al. | |
| 4,177,760 A | 12/1979 | Slater | |
| 4,222,346 A | 9/1980 | Reisgies | |
| 4,253,421 A | 3/1981 | Slater et al. | |
| 4,254,754 A * | 3/1981 | Takada ................ | F02D 35/0061 123/437 |
| 4,295,490 A | 10/1981 | Boudreau | |
| 4,305,346 A | 12/1981 | Sparr, Sr. | |
| 4,332,215 A | 6/1982 | Larson | |
| 4,333,387 A | 6/1982 | Seitz | |
| 4,333,421 A | 6/1982 | Schluckbier | |
| 4,344,385 A | 8/1982 | Swanson et al. | |
| 4,372,345 A | 2/1983 | Mehus | |
| 4,378,757 A | 4/1983 | Hamann | |
| 4,393,811 A | 7/1983 | Bodmin | |
| 4,395,971 A | 8/1983 | Happel et al. | |
| 4,403,568 A | 9/1983 | Fukuhara et al. | |
| 4,403,569 A | 9/1983 | Bennett | |
| 4,459,938 A | 7/1984 | Noorlander | |
| 4,462,425 A | 7/1984 | Menus | |
| 4,485,762 A | 12/1984 | Sutton et al. | |
| 4,498,419 A | 2/1985 | Flocchini | |
| 4,516,530 A | 5/1985 | Reisgies et al. | |
| 4,572,105 A | 2/1986 | Chowdhury et al. | |
| 4,586,462 A | 5/1986 | Icking | |
| 4,593,649 A | 6/1986 | Britten | |
| 4,903,639 A | 2/1990 | Kessel | |
| 4,907,535 A | 3/1990 | Matsuzawa et al. | |
| 4,924,809 A | 5/1990 | Verbrugge | |
| 4,936,254 A | 6/1990 | Marshall | |
| 5,052,341 A | 10/1991 | Woolford et al. | |
| 5,101,770 A | 4/1992 | Stevenson | |
| 5,134,967 A | 8/1992 | Marshall | |
| 5,161,482 A | 11/1992 | Griffin | |
| 5,166,313 A | 11/1992 | Archibald et al. | |
| 5,167,201 A | 12/1992 | Peles | |
| 5,178,095 A | 1/1993 | Mein | |
| 5,218,924 A | 6/1993 | Thompson et al. | |
| 5,255,628 A | 10/1993 | Kristoffer | |
| 5,379,722 A | 1/1995 | Larson | |
| 5,386,799 A | 2/1995 | Dietrich | |
| 5,390,627 A | 2/1995 | Van Der Berg et al. | |
| 5,403,005 A | 4/1995 | Avila-Valdez | |
| 5,493,995 A | 2/1996 | Chowdhury | |
| 5,568,788 A | 10/1996 | Van Den Berg et al. | |
| 5,572,947 A | 11/1996 | Larson et al. | |
| 5,673,650 A | 10/1997 | Mottram et al. | |
| 5,697,325 A | 12/1997 | Gehm et al. | |
| 5,722,343 A | 3/1998 | Aurik et al. | |
| 5,769,025 A | 6/1998 | Van Der Lely et al. | |
| 5,778,820 A | 7/1998 | Van Der Lely et al. | |
| 5,850,845 A | 12/1998 | Pareira et al. | |
| 5,881,669 A | 3/1999 | Van Den Berg et al. | |
| 5,896,828 A | 4/1999 | Kronschnabel et al. | |
| 5,909,716 A | 6/1999 | Van Der Lely | |
| 5,934,220 A | 8/1999 | Hall et al. | |
| 5,957,081 A | 9/1999 | Van Der Lely et al. | |
| 5,960,736 A | 10/1999 | Ludington et al. | |
| 5,992,347 A | 11/1999 | Innings et al. | |
| 6,009,833 A | 1/2000 | Van Der Lely | |
| 6,079,359 A | 6/2000 | Van Den Berg | |
| 6,089,242 A | 7/2000 | Buck | |
| 6,098,570 A | 8/2000 | Aurik et al. | |
| 6,202,593 B1 | 3/2001 | Maier et al. | |
| 6,234,110 B1 | 5/2001 | Xavier | |
| 6,244,215 B1 | 6/2001 | Oosterling | |
| 6,267,077 B1 | 7/2001 | Van Den Berg et al. | |
| 6,276,297 B1 | 8/2001 | Van Den Berg et al. | |
| 6,308,655 B1 | 10/2001 | Oosterling | |
| 6,318,299 B1 | 11/2001 | Birk | |
| 6,321,682 B1 | 11/2001 | Eriksson et al. | |
| 6,367,416 B1 | 4/2002 | Van Der Lely | |
| 6,371,046 B1 | 4/2002 | Petterson et al. | |
| 6,435,132 B1 | 8/2002 | Milbrath et al. | |
| 6,546,893 B1 | 4/2003 | Happel et al. | |
| 6,550,420 B1 | 4/2003 | Bjork | |
| 6,561,126 B2 | 5/2003 | Forsen et al. | |
| 6,584,930 B2 | 7/2003 | Buecker | |
| 6,591,784 B1 | 7/2003 | Eriksson | |
| 6,598,560 B1 | 7/2003 | Van Den Berg | |
| 6,619,227 B1 | 9/2003 | Berger et al. | |
| 6,626,130 B1 | 9/2003 | Eriksson | |
| 6,644,240 B1 | 11/2003 | Dietrich | |
| 6,752,102 B2 | 6/2004 | Dahl et al. | |
| 6,755,153 B1 | 6/2004 | Chowdhury | |
| 6,935,270 B2 | 8/2005 | Wipperfurth et al. | |
| 6,997,135 B1 | 2/2006 | DeWaard | |
| 6,997,136 B1 | 2/2006 | Coates | |
| 7,036,981 B2 | 5/2006 | Veenstra et al. | |
| 7,128,020 B2 | 10/2006 | Björk et al. | |
| 7,143,718 B2 | 12/2006 | Bosma et al. | |
| 7,162,970 B2 | 1/2007 | Maier, Jr. | |
| 7,174,848 B2 | 2/2007 | Brown et al. | |
| 7,178,480 B2 | 2/2007 | Dahl et al. | |
| 7,237,694 B2 | 7/2007 | Freudinger | |
| 7,263,948 B2 | 9/2007 | Ericsson et al. | |
| 7,281,493 B2 | 10/2007 | Dietrich | |
| 7,290,497 B2 | 11/2007 | Rottier et al. | |
| 7,350,478 B2 | 4/2008 | Fernandez | |
| 7,377,232 B2 | 5/2008 | Holmgren et al. | |
| 7,401,573 B2 | 7/2008 | Torgerson | |

(56) References Cited

U.S. PATENT DOCUMENTS

| | | |
|---|---|---|
| 7,412,943 B2 | 8/2008 | Ericsson et al. |
| 7,484,474 B2 | 2/2009 | Van Den Berg et al. |
| 7,536,975 B2 | 5/2009 | Denes et al. |
| 7,575,022 B2 | 8/2009 | Higgins |
| 7,578,260 B2 | 8/2009 | Shin |
| 7,707,966 B2 | 5/2010 | Torgerson et al. |
| 7,765,951 B2 | 8/2010 | Dietrich |
| 7,793,614 B2 | 9/2010 | Ericsson et al. |
| 7,926,449 B2 | 4/2011 | Stellnert et al. |
| 7,963,249 B2 | 6/2011 | Duke |
| 8,025,029 B2 | 9/2011 | Torgerson et al. |
| 8,033,247 B2 | 10/2011 | Torgerson et al. |
| 8,117,989 B2 | 2/2012 | Torgerson et al. |
| 8,210,123 B2 | 7/2012 | Duke |
| 8,240,272 B2 | 8/2012 | Duke |
| 8,342,125 B2 | 1/2013 | Torgerson et al. |
| 8,590,486 B2 | 11/2013 | Torgerson et al. |
| 8,677,937 B2 | 3/2014 | Shin |
| 8,770,146 B2 | 7/2014 | Buck et al. |
| 8,925,483 B2 | 1/2015 | Torgerson et al. |
| 8,991,335 B2 | 3/2015 | Torgerson et al. |
| 9,016,238 B2 | 4/2015 | Duke |
| 9,049,835 B2 | 6/2015 | Duke |
| 9,072,273 B2 | 7/2015 | Torgerson et al. |
| 9,468,189 B2 | 10/2016 | Torgerson et al. |
| 9,468,190 B2 | 10/2016 | Duke |
| 9,510,556 B2 | 12/2016 | Torgerson et al. |
| 9,526,224 B2 * | 12/2016 | Balkenhol ............... A01J 5/04 |
| 9,545,079 B2 | 1/2017 | Torgerson et al. |
| 9,686,958 B2 | 6/2017 | Sellner et al. |
| 9,763,421 B2 | 9/2017 | Torgerson et al. |
| 9,770,006 B2 | 9/2017 | Torgerson et al. |
| 9,883,652 B2 | 2/2018 | Torgerson et al. |
| 9,930,862 B2 | 4/2018 | Torgerson et al. |
| 10,426,128 B2 | 10/2019 | Balkenhol et al. |
| 10,499,610 B2 | 12/2019 | Torgerson et al. |
| 10,502,330 B2 | 12/2019 | Balkenhol |
| 10,681,895 B2 | 6/2020 | Sellner et al. |
| 2002/0185071 A1 | 12/2002 | Guo |
| 2003/0226520 A1 | 12/2003 | Dietrich |
| 2004/0089242 A1 | 5/2004 | Verstege et al. |
| 2004/0231603 A1 | 11/2004 | Bjork et al. |
| 2005/0274327 A1 | 12/2005 | Johnsson et al. |
| 2006/0016399 A1 | 1/2006 | Torgerson |
| 2006/0037542 A1 | 2/2006 | Denes et al. |
| 2006/0049212 A1 | 3/2006 | Freudinger |
| 2006/0112887 A1 | 6/2006 | Brown et al. |
| 2007/0070803 A1 | 3/2007 | Urquhart |
| 2007/0157887 A1 | 7/2007 | Fernandez |
| 2007/0186860 A1 | 8/2007 | Dietrich |
| 2007/0215053 A1 | 9/2007 | Duke |
| 2007/0277737 A1 | 12/2007 | Maier et al. |
| 2008/0022932 A1 | 1/2008 | Rottier et al. |
| 2008/0202433 A1 | 8/2008 | Duke |
| 2008/0276871 A1 | 11/2008 | Auburger et al. |
| 2008/0314322 A1 | 12/2008 | Stellnert et al. |
| 2009/0050061 A1 | 2/2009 | Duke |
| 2009/0050062 A1 | 2/2009 | Auburger et al. |
| 2009/0064937 A1 | 3/2009 | Rottier et al. |
| 2009/0151641 A1 | 6/2009 | Schulze Wartenhorst et al. |
| 2009/0165724 A1 | 7/2009 | Mader et al. |
| 2009/0320760 A1 | 12/2009 | Torgerson et al. |
| 2010/0132626 A1 | 6/2010 | Torgerson et al. |
| 2010/0154900 A1 | 6/2010 | Torgerson et al. |
| 2010/0236487 A1 | 9/2010 | Stellnert et al. |
| 2010/0326360 A1 | 12/2010 | Duke et al. |
| 2011/0220028 A1 | 9/2011 | Duke |
| 2011/0220160 A1 | 9/2011 | Bosma |
| 2011/0232575 A1 | 9/2011 | Duke |
| 2012/0017836 A1 | 1/2012 | Torgerson et al. |
| 2012/0111275 A1 | 5/2012 | Torgerson et al. |
| 2012/0118237 A1 | 5/2012 | Torgerson et al. |
| 2012/0118238 A1 | 5/2012 | Torgerson et al. |
| 2012/0272911 A1 | 11/2012 | Duke |
| 2013/0199449 A1 | 8/2013 | Daniel |
| 2014/0283751 A1 | 9/2014 | Buck et al. |
| 2015/0173320 A1 | 6/2015 | Balkenhol et al. |
| 2015/0201577 A1 | 7/2015 | Duke |
| 2015/0260302 A1 | 9/2015 | Peterson et al. |
| 2016/0319947 A1 | 11/2016 | Balkenhol |
| 2017/0014837 A1 | 1/2017 | Duke |
| 2017/0164576 A1 | 6/2017 | Balkenhol et al. |
| 2017/0359995 A1 | 12/2017 | Sellner et al. |
| 2018/0064056 A1 | 3/2018 | Torgerson et al. |
| 2018/0220616 A1 | 8/2018 | Torgerson et al. |
| 2018/0235173 A1 | 8/2018 | Torgerson et al. |
| 2019/0133067 A1 | 5/2019 | Stuessel et al. |
| 2019/0133069 A1 | 5/2019 | Stuessel et al. |
| 2020/0088310 A1 | 3/2020 | Balkenhol |

FOREIGN PATENT DOCUMENTS

| | | |
|---|---|---|
| AU | 2015227478 B2 | 6/2018 |
| DE | 1801758 | 6/1970 |
| DE | 1582939 | 7/1970 |
| DE | 2622794 | 12/1977 |
| DE | 3540058 | 5/1987 |
| DE | 261300 | 10/1988 |
| DE | 4006785 | 9/1990 |
| DE | 10160161 A1 | 6/2003 |
| EP | 0277396 A1 | 8/1988 |
| EP | 0313109 A1 | 4/1989 |
| EP | 0319523 A2 | 6/1989 |
| EP | 0332235 A2 | 9/1989 |
| EP | 0459817 A1 | 12/1991 |
| EP | 0479397 A2 | 4/1992 |
| EP | 0527509 A2 | 2/1993 |
| EP | 0543463 A1 | 5/1993 |
| EP | 0583166 A2 | 2/1994 |
| EP | 0630557 A2 | 12/1994 |
| EP | 0728412 A2 | 8/1996 |
| EP | 0801893 A2 | 10/1997 |
| EP | 0945057 A1 | 9/1999 |
| EP | 1001199 A2 | 5/2000 |
| EP | 1219167 A2 | 7/2002 |
| EP | 1222853 A2 | 7/2002 |
| EP | 1089615 B1 | 3/2003 |
| EP | 1520469 A1 | 4/2005 |
| EP | 1543720 A1 | 6/2005 |
| EP | 1790217 A2 | 5/2007 |
| EP | 1795069 A1 | 6/2007 |
| EP | 1679956 B1 | 12/2008 |
| EP | 2113169 A1 | 11/2009 |
| EP | 1933616 B1 | 1/2011 |
| EP | 2277373 A2 | 1/2011 |
| EP | 1737291 B1 | 11/2013 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002345955 | 12/2002 |
| JP | 2005192404 | 7/2005 |
| NL | 1016237 | 3/2002 |
| NL | 1021950 C | 5/2004 |
| SU | 1676538 | 9/1991 |
| WO | 1993/13651 | 7/1993 |
| WO | 1998/28969 | 7/1998 |
| WO | 1999/27775 | 6/1999 |
| WO | 1999/46978 | 9/1999 |
| WO | 1999/66767 | 12/1999 |
| WO | 1999/66787 | 12/1999 |
| WO | 01/17337 | 3/2001 |
| WO | 01/17338 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 04/032608 | 4/2004 |
| WO | 2004/030445 A2 | 4/2004 |
| WO | 05/022986 | 3/2005 |

(56) References Cited

FOREIGN PATENT DOCUMENTS

| | | |
|---|---|---|
| WO | 05/043986 | 5/2005 |
| WO | 05/072516 | 8/2005 |
| WO | 05/102035 | 11/2005 |
| WO | 2006/029797 | 3/2006 |
| WO | 2006/091710 A2 | 8/2006 |
| WO | 2006/110079 A1 | 10/2006 |
| WO | 2006/117019 | 11/2006 |
| WO | 2006/135917 | 12/2006 |
| WO | 2007/031783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/077607 | 6/2009 |
| WO | 2009/158000 | 12/2009 |
| WO | 2010/053577 | 5/2010 |
| WO | 2011/28292 | 3/2011 |
| WO | 2011/28293 | 3/2011 |
| WO | 2011/28294 | 3/2011 |
| WO | 2011102911 | 8/2011 |
| WO | 2014/016588 A1 | 1/2014 |
| WO | 2015/118336 A1 | 2/2015 |
| WO | 2015/145116 A1 | 10/2015 |
| WO | 2015/150807 A1 | 10/2015 |
| WO | 2017/191057 | 11/2017 |
| WO | 2019/090044 | 5/2019 |
| WO | 2019/090136 A9 | 5/2019 |

OTHER PUBLICATIONS

"3-A® Accepted Practices for Permanently Installed Product and Solution Pipelines and Cleaning Systems Used in Milk and Milk Product Processing Plants, No. 605-04," Section N; Aug. 20, 1994.
Akam, D.N., "The Development of Equipment for the Mechanization of Manual Operations in Milking Machine," 17th Annual Meeting, National Mastitis Counsel, Inc., Feb. 21-23, 1978, pp. 417-426.
Grindal; et al., "Automatic application of teat disinfectant through the milking machine cluster" Journal of Dairy Research, 56:579-585 (1989).
International Search Report and Written Opinion from PCT/US2011/00322, dated Dec. 20, 2011.
Letter to Alex Ferguson from Jeffry W. Smith dated Dec. 22, 2006, 2pp.
Neijenhuis; et al., "Health of dairy cows milked by an automatic milking system; Effects of milking interval on teat condition and milking performance with whole-udder take off", Oct. 2003, 23 pages.
Office Action for U.S. Appl. No. 10/576,744 dated Jun. 3, 2010, 8pp.
Office Action for U.S. Appl. No. 11/652,372 dated Feb. 11, 2008, 14pp.
Office Action for U.S. Appl. No. 11/662,454 dated Aug. 16, 2010, 20 pp.
Office Action for U.S. Appl. No. 11/904,769 dated Feb. 20, 2008, 9pp.
Office Action for U.S. Appl. No. 12/712,787 dated Jun. 27, 2011.
PCT/GB04/004343—Written Opinion of ISA & IPRP rec'd Feb. 3, 2005, 5pp.
PCT/US06/023075—ISR & Written Opinion rec'd Oct. 16, 2006.
PCT/US09/006026—IPRP, Written Opinion of ISA & ISR rec'd Mar. 6, 2010, 9pp.
"PCT/US09/03770—IPRP and Written Opinion reed Jan. 13, 2011, and ISR rec'd Oct. 7, 2009".
Preliminary Amendment for U.S. Appl. No. 10/576,744, filed Apr. 21, 2006, 16pp.
Preliminary Amendment for U.S. Appl. No. 10/576,744, filed Aug. 7, 2008, 10 pp.
Shearn; et al., "Reduction of bacterial contamination of teat cup liners by an entrained wash system," Veterinary Record (1994), 134, 450, 1p.
Thompson; et al. "The End-Of-Milking Sequence and its Mechanization" 1976 Winter Mtg., Dec. 14-17, 1976, Animal Physiology and Genetics Inst., Beltsville, MD, 15pp.
U.S. Appl. No. 60/566,313, filed Apr. 29, 2004, J.R.J. Duke.
U.S. Appl. No. 60/566,314, filed Apr. 29, 2004, J.R.J. Duke.
U.S. Appl. No. 60/578,997, filed Jun. 12, 2004, Kevin L. Torgerson.
Notice of Opposition and Opposition brief for EP Patent 1737291, Filed on Aug. 26, 2014 by GEA Farm Technologies GmbH, 74 pages.
Response filed Feb. 2, 2015 by an Udder IP Company in the Opposition of EP Patent 1737291, 53 pages.
European Search Report dated Sep. 24, 2015 for EP Application No. 15171008.4, 6 pages.
Reply filed on Dec. 16, 2015 by GEA Farm Technologies GmbH in the Opposition of EP Patent No. 1737291, 75 pages.
Wildbrett et al., "Öber Reinigung and Desinfektion von Tanks" Materials and Corrosion 12(12):759-764. Nov. 1961.
European Patent Office Preliminary Opinion and Summons to Attend Oral Proceedings issued Jan. 18, 2016, Opposition of EP Patent 1737291, 12 pages.
European Search Report dated Aug. 13, 2014, EP Application No. 14159588.4, 5 pages.
International Search Report and Written Opinion from PCT/EP2014/077684, dated Apr. 10, 2015, 10 pages.
International Search Report and Written Opinion from PCT/US2018/058897, dated Feb. 25, 2019, 19 pages.
International Search Report and Written Opinion from PCT/US2018/059041, dated Mar. 8, 2019, 20 pages.
International Search Report for PCT/EP2017/060232, dated Aug. 3, 2017, 2 pages.
German Search Report for DE Application No. 10 2016 108 300.3, dated Mar. 10, 2017, 7 pages.
Amendments and Observations filed Oct. 24, 2016 by an Udder IP Company Ltd in the Opposition of EP Patent 1737291, 47 pages.
Amendments and Observations filed Oct. 25, 2016 by GEA Farm Technologies GmbH in the Opposition of EP Patent 1737291, 13 pages.
Nov. 10, 2016 EPO Communication re: the Proprietor, An Udder IP Company Ltd's request concerning the staying/postponement of the opposition proceedings, Opposition of EP Patent 1737291, 1 page.
Nov. 25, 2016 EPO Communication re: results of the oral proceedings, Opposition of EP Patent 1737291, 5 pages.
Dec. 8, 2016 EPO Communication; Details and minutes of the oral proceedings, Opposition of EP Patent 1737291, 13 pages.
Mar. 30, 2017 EPO Communication, State of the Opposition Procedure and Invitation to File Observations, Opposition of EP Patent 1737291, 10 pages.
Response filed by Udder IP Company LTD on Jun. 2, 2017, Opposition of EP Patent 1737291, 4 pages.
Response filed by GEA Farm Technologies GmbH on May 29, 2017, Opposition of EP Patent 1737291, 5 pages.
Jul. 27, 2017 EPO Communication; State of the Opposition Procedure and Summons to Attend Oral Proceedings, Opposition of EP Patent 1737291, 10 pages.
European Search Report dated Oct. 13, 2017, for European Application No. 17171229.2, 6 pages.
Mar. 13, 2018 Letter from the Proprietor, An Udder IP Company Ltd, Regarding the Opposition Procedure for Oapposition of EP Patent 1737291, 23 pages.
May 17, 2018 EPO Communication; Details and minutes of the oral proceedings, Opposition of EP Patent 1737291, 9 pages.
May 31, 2018 Interlocutory Decision in Opposition Proceedings, Opposition of EP Patent 1737291, 49 pages.
Sep. 27, 2018 Statement of Grounds for Appeal, Opposition of EP Patent 1737291, 29 pages.
Feb. 4, 2019 Reply to Grounds for Appeal, Opposition of EP Patent 1737291, 32 pages.
European Search Report dated Jan. 30, 2020 for European Application No. 19204875.9, 6 pages.
International Preliminary Report on Patentability for International Application No. PCT/US2018/059041, dated May 5, 2020, 12 pages.

(56) References Cited

OTHER PUBLICATIONS

International Preliminary Report on Patentability for International Application No. PCT/US2018/058897, dated May 5, 2020, 10 pages.
Mar. 20, 2020 Examination Report for Australian Application No. 2018211343, 7 pages.
Oct. 15, 2020 Communiation Regarding Oral Proceedings in Opposition to EP Patent 1737291, 10 pages.

* cited by examiner

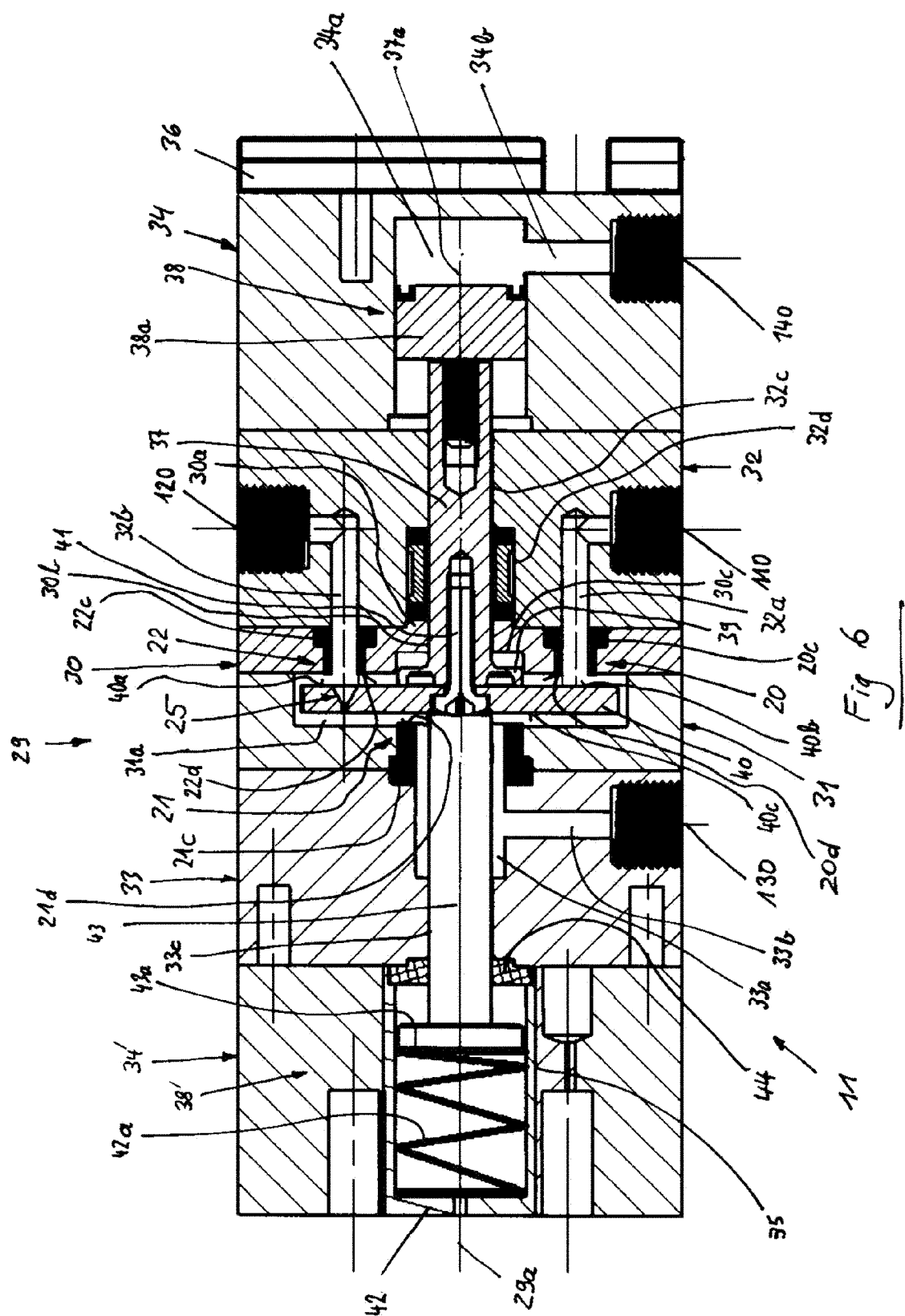

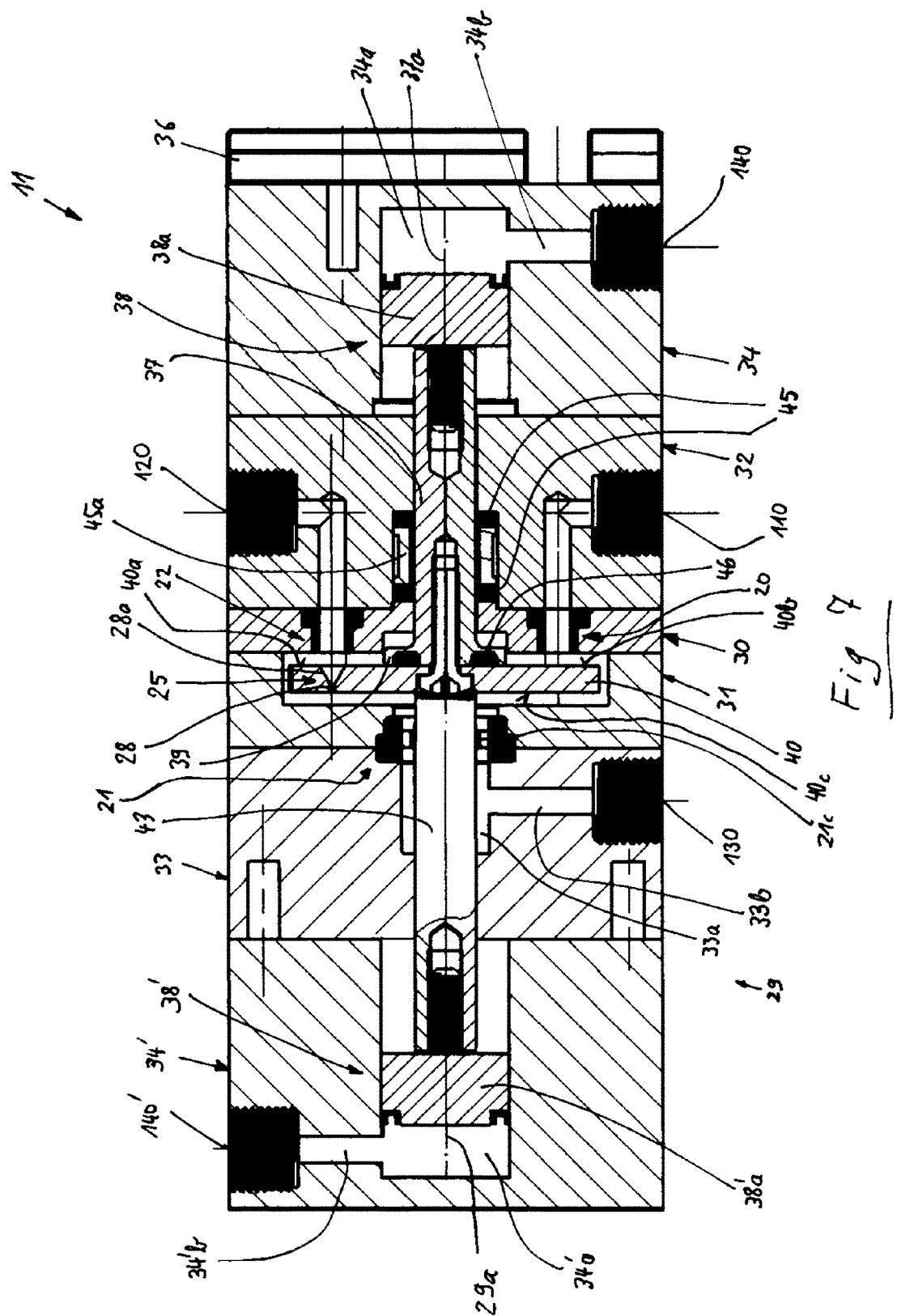

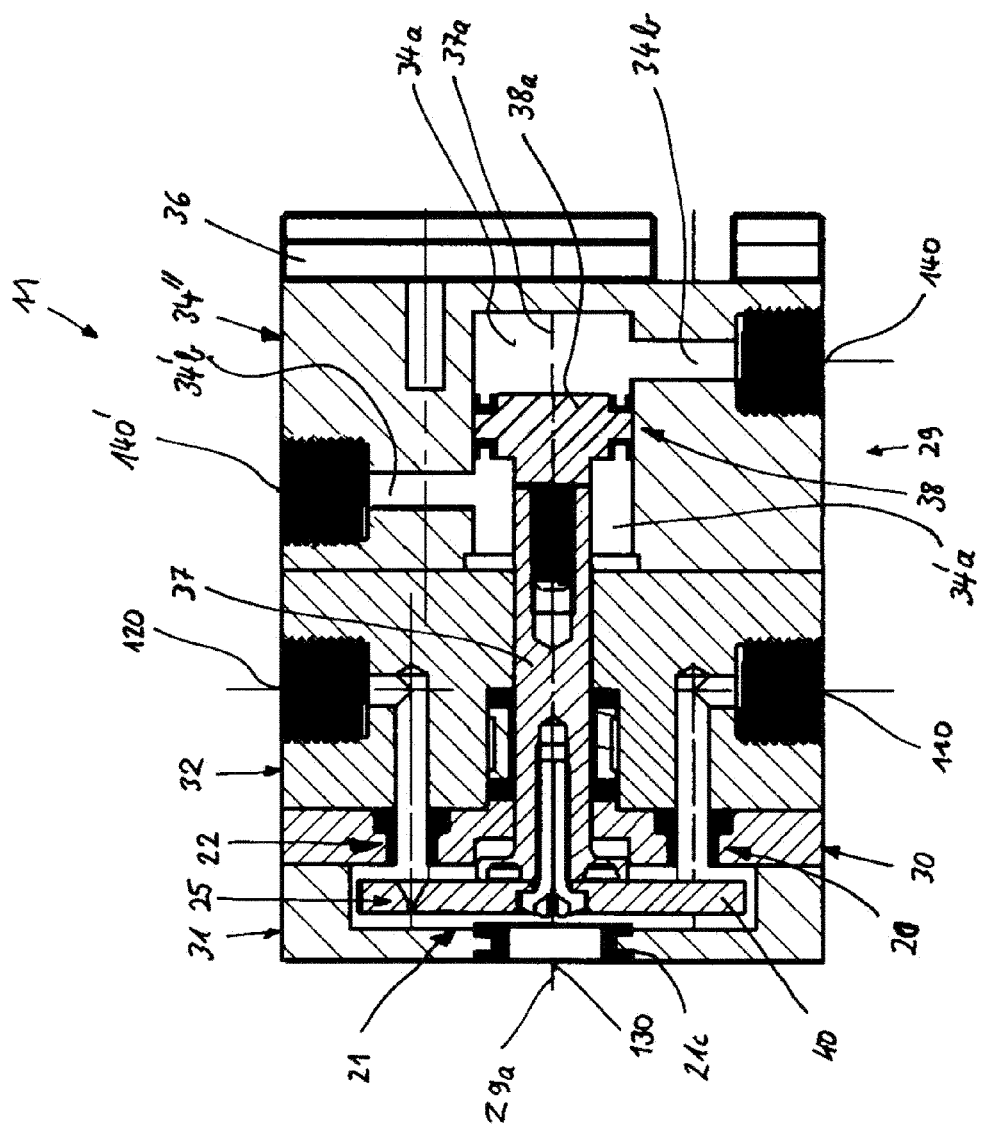

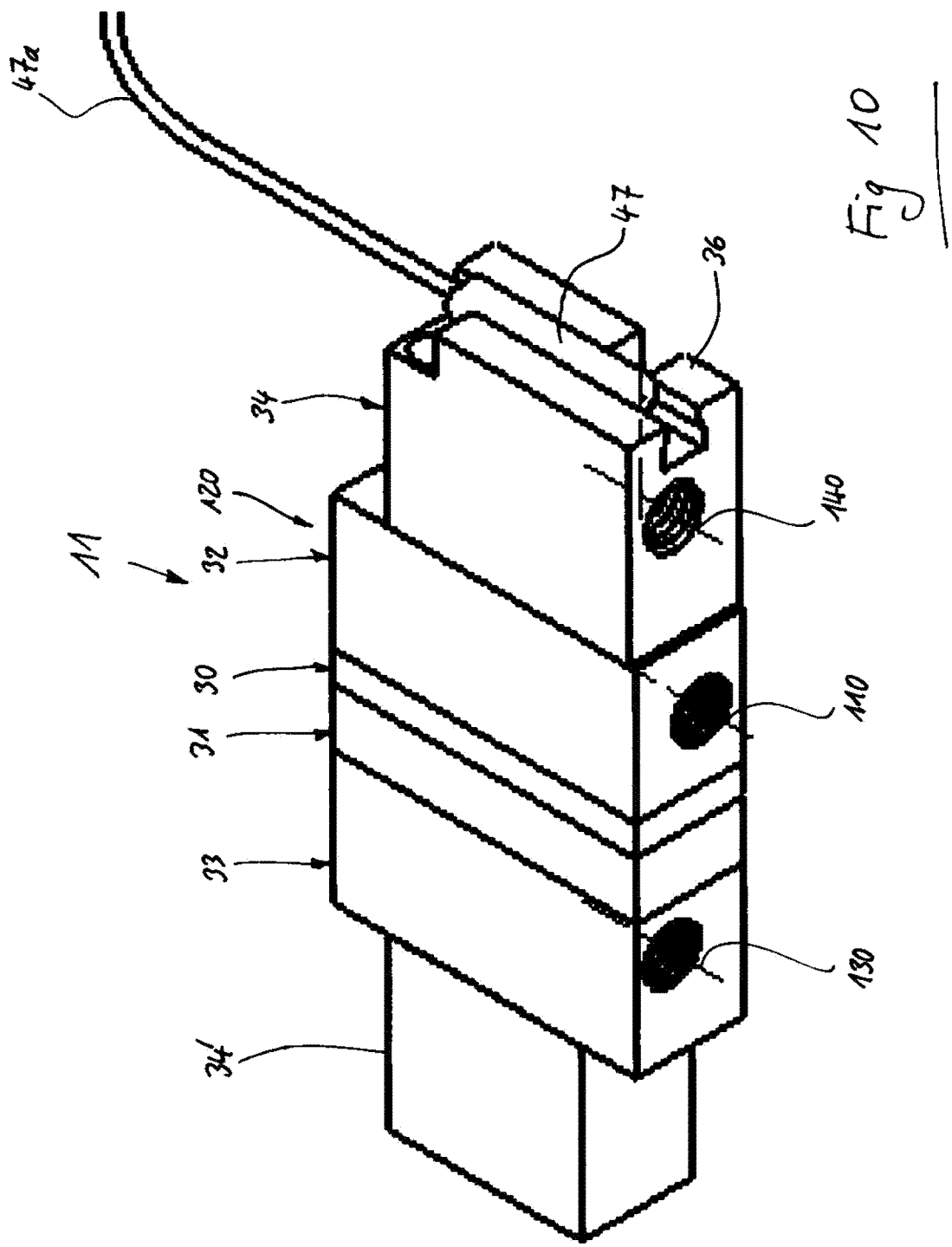

SAFETY VALVE

CROSS REFERENCE TO RELATED APPLICATION

This application is a national phase application under 35 U.S.C. 371 of PCT Application No. PCT/EP2017/060232, filed Apr. 28, 2017, the disclosure of which is incorporated by reference herein.

FIELD AND BACKGROUND OF THE INVENTION

The invention relates to a safety valve in accordance with the preamble of claim 1.

Safety valves of this type are also called block bleed block valves and are used in cleaning apparatuses for milking systems, in particular for automatically milking milk-producing animals, for example cows, sheep, goats. The automatic milking operation can be carried out by means of what are known as milking robots. The safety valve is required for the introduction of what is known as a dipping liquid onto the teat of a milk-producing animal.

Relevant national rules and guidelines, for example the American FDA guidelines, are to be observed and maintained, which apply to cleaning apparatuses for milking systems and milking equipment which come into contact with milk.

The safety valve comprises two block valves and a bleed valve and is adjusted from a first switching position which is called the block position in the following text into a second switching position which is called the passage position in the following text, and back again. In the block position, the block valves have to be closed and at the same time the bleed valve has to be open, the block valves being open and the bleed valve being closed in the passage position.

Document DE 10 2013 114 595 A1 describes a safety valve for a cleaning apparatus for an automatic milking system. Furthermore, the description of the function and the construction of a cleaning apparatus is specified in document WO 2010/053577 A1.

Said safety valve is designed as a slide valve. It is considered to be disadvantageous here that the service life is not sufficient in the case of the requirements of a modified process. The modified cleaning and dipping process requires a switching service life of the valve which is increased by a factor of from 10 to 15.

SUMMARY OF THE INVENTION

Against said background, it is the object of the invention to provide an improved safety valve with a higher service life and costs which as far as possible remain the same.

A safety valve according to the invention for a cleaning apparatus for a milking system for milking milk-producing animals comprises a first block valve with an inlet connector, a second block valve with an outlet connector, a bleed valve with a bleed outlet connector, a piston rod and a drive unit, the safety valve being configured such that it can be adjusted from a block position, in which the first block valve and the second block valve are closed for blocking the inlet connector and the outlet connector, and the bleed valve is open for connecting the bleed outlet connector to a connection, into a passage position, in which the first block valve and the second block valve are open for connecting the inlet connector via the connection to the outlet connector, and the bleed valve is closed for blocking the bleed outlet connector, and back again. The first block valve, the second block valve and the bleed valve of the safety valve are configured as seat valves with a common piston plate.

This advantageously achieves a situation where the configuration of the block valves and the bleed valve as seat valves can achieve the required higher switching service life of 10 years, and can achieve the $15 \times 10^6$ switching cycles which occur in the process.

The embodiment as a seat valve additionally brings the advantage that dynamic loading of components can be lowered many times over as a result of considerably small adjustment travels.

In one embodiment, the piston plate has seat section faces of the valves which are configured as seat valves. Said seat section faces can be manufactured together, for example, in one production operation. In addition, no seals are required on the piston plate, as a result of which a number of parts is lowered.

It is provided in a further embodiment that the piston plate is coupled with one side via the piston rod to a first drive unit, and is coupled with a side which lies opposite the one side by means of a drive rod to a second drive unit. This results in a compact construction. In addition, an adjustment travel or lift which is substantially smaller in comparison with the prior art of 3 mm is possible, in contrast to 8 mm in the prior art. A more rapid switching time is achieved as a result. Moreover, lower quantities can be metered, that is to say a loss can be reduced.

Here, the first drive unit can have a drive cylinder with a drive piston, and the second drive unit can have a force accumulator element, for example a compression spring, which prestresses the piston plate into the block position for closing the block valves and holds it in the block position.

As an alternative, the first drive unit and the second drive unit can have in each case one drive cylinder with a drive piston. In this way, identical parts can be used.

In a further alternative, the piston plate can be coupled with one side via the piston rod to a double-acting drive cylinder of the drive unit. This results in the advantage of a particularly compact construction which takes up only a very small amount of installation space.

It is particularly advantageous if the safety valve has a valve body with a longitudinal axis, which valve body is constructed in a sandwich design from different functional units which comprise a block valve unit, a bleed valve unit, a connecting unit and at least one drive unit. This results in a modular construction.

In one embodiment, the connection is formed from a pressure chamber between the block valve unit and the bleed valve unit, the piston plate being arranged in the pressure chamber such that it can be adjusted out of the passage position into the block position and back again.

A further embodiment provides that, in the block position, the first block valve and the second block valve are closed for blocking the inlet connector and the outlet connector by way of one side of the piston plate, and the bleed valve connects the bleed outlet connector to the pressure chamber. The two block valves are closed and opened by the common piston plate. The valves require only a small number of seals which, in contrast to the prior art, are not loaded by way of friction as a result of the adjustment of a slide, but rather only by way of pressure, which results in lower wear as a further advantage.

In the passage position, the first block valve and the second block valve communicate by way of the pressure chamber for connecting the inlet connector to the outlet connector, and the bleed valve is closed for blocking the bleed outlet connector by way of the other side of the piston plate. This also results in the abovementioned advantages with regards to the seals and the common piston plate.

It is provided in a further refinement that the block valves and the bleed valve have in each case one sealing bush with in each case one seat section, each seat section interacting with in each case one associated seat section face of the piston plate. This results in a simple inexpensive construction with a low number of seals. In addition, the sealing bushes can be replaced, which is advantageous for adaptation to different uses and in the case of maintenance.

In another embodiment, the safety valve is provided with a venting device for venting the head of a teat cup, which is to be assigned to it, of an associated milking system, which venting device communicates with the outlet connector of the second block valve. The advantage here is that the venting device can be attached in a compact design in or on the safety valve. For example, a check valve at the outlet connector of the second block valve is possible.

Yet another embodiment provides that the venting device has a venting opening which is connected to a cone or to a conically configured bore, for example a counterbore, the venting opening being formed in the piston plate. Here, the advantage consists in that clogging of a check valve on account of glycerin constituent parts in the dipping medium does not occur. Moreover, a further advantage consists in that the venting opening and the cone can be formed in the piston plate in a simple way, without the necessity of additional components. Instead of the cone, it is also possible, for example, to provide at least one stepped bore.

The venting device can also be of adjustable configuration, for example by way of setting screws or different inserts which have the venting bore with the cone and can be inserted into the piston plate. This can also take place automatically in a further embodiment in such a way that the milking process can be affected directly and individually, such as for improved adhesion of a teat rubber of the teat cup on the teat and/or more rapid milk transport in the case of high milk flows.

In a further embodiment, the piston plate and the drive piston have an anti-rotation safeguard about a piston axis. This is not only particularly advantageous in the case of the venting device in the piston plate, but rather also in the case of a sensor, the hysteresis of which is not changed as a result of a rotation of a sensor actuator, for example a magnet, which increases reliability of a position detection of the safety valve by way of the sensor.

In one embodiment, the anti-rotation safeguard can be formed by way of a shape of the piston plate and/or of the drive piston, for example an oval shape, positively locking engagements, etc.

In one alternative embodiment, the anti-rotation safeguard can be formed by way of the shape of a flange of the piston rod, to which flange the piston plate is fastened, and by way of a stationary recess which communicates with said flange. This is particularly advantageous, since special shaping of the pressure chamber and/or piston chamber is not required.

In a further alternative, the anti-rotation safeguard is formed by way of a pin which forms a guide for the piston plate. This can be manufactured simply.

Another embodiment provides that the safety valve has a sensor for detecting the block position and/or the passage position. In this way, a function of the safety valve, in particular a safety function of the block position, can be monitored simply.

To this end, it is provided in a further embodiment that the sensor interacts with a sensor actuating element which is attached on or in the drive piston. This results in a simple construction.

A further embodiment affords the advantage of a contactless actuation if the sensor actuating element is a magnet. In this case, the sensor can have a component which is sensitive to magnetic fields, such as a reed contact, a Hall sensor, an HF coil, etc.

As a block bleed block (BBB) valve, the safety valve affords the advantage of a large area of use; in particular, it complies with relevant safety rules, for example the FDA in the USA. On account of the drive and the construction of the safety valve according to the invention, a considerably increased total cycle number can be achieved. A number of dynamically loaded seals is lowered many times over by way of considerably smaller adjusting or switching travels.

A plurality of safety valves can be connected to one another in a simple way and can be used in a compact manner as a safety valve arrangement.

BRIEF DESCRIPTION OF THE DRAWINGS

Further advantages and details are apparent from the exemplary embodiment which is shown in the figures of the drawing, in which:

FIG. 6 shows one exemplary embodiment of the safety valve in accordance with FIG. 5 in a longitudinal sectional view.

FIGS. 7-8 show diagrammatic sectional views of variants of the exemplary embodiment in accordance with FIG. 6, FIG. 10 shows a diagrammatic perspective view of the exemplary embodiment in accordance with FIG. 6.

DETAILED DESCRIPTION OF THE DRAWINGS

In the figures, identical or similar functional elements and components are provided with identical designations.

The terms "top", "bottom", "left", "right" relate to the respective arrangement in the figures. Other installed positions which are not shown, for example upside down, laterally or in another position, are of course possible.

Figure 1:
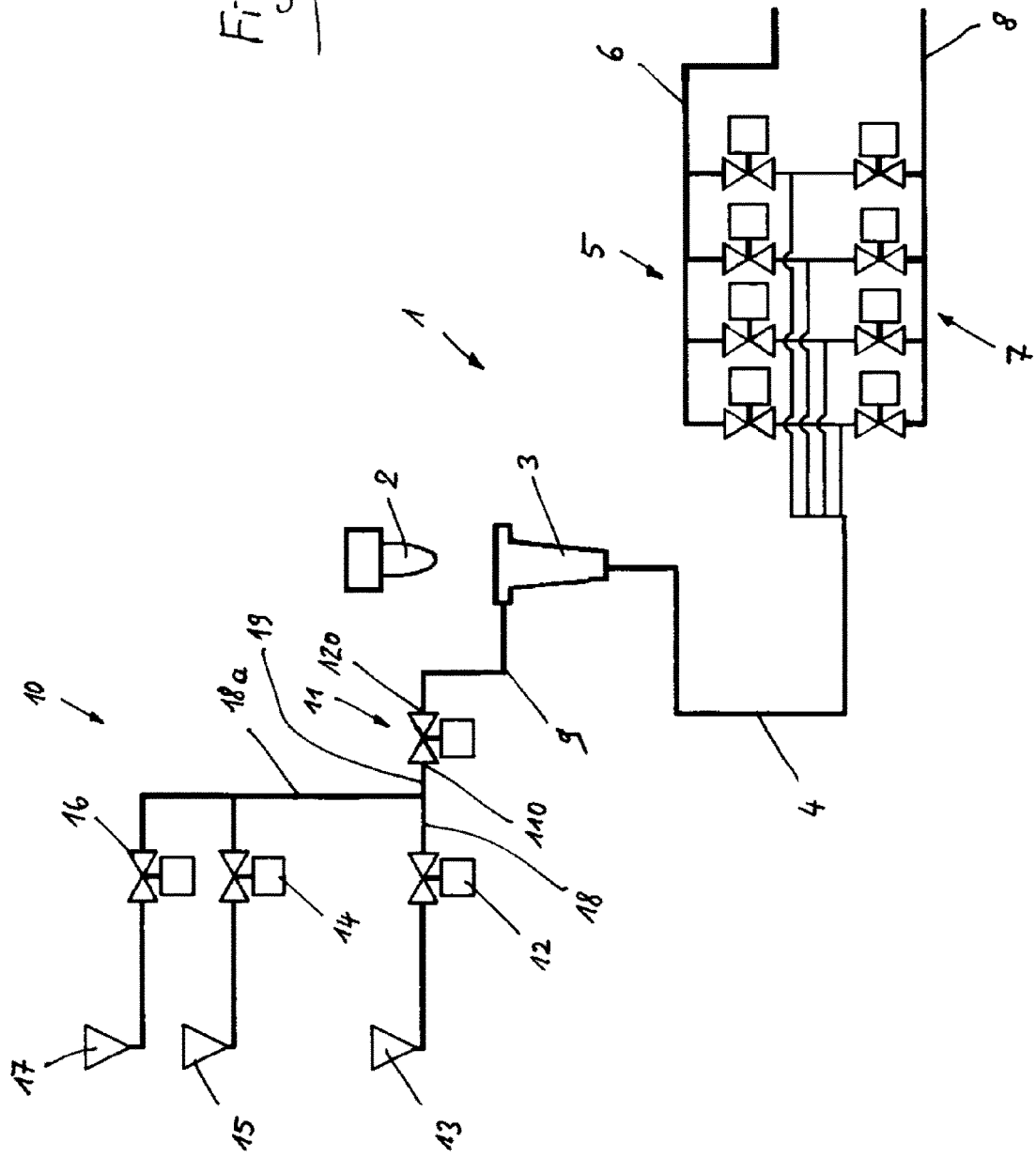
FIG. 1 shows a diagrammatic illustration of an exemplary use of a safety valve according to the invention in an exemplary milking system.
Figure 2:
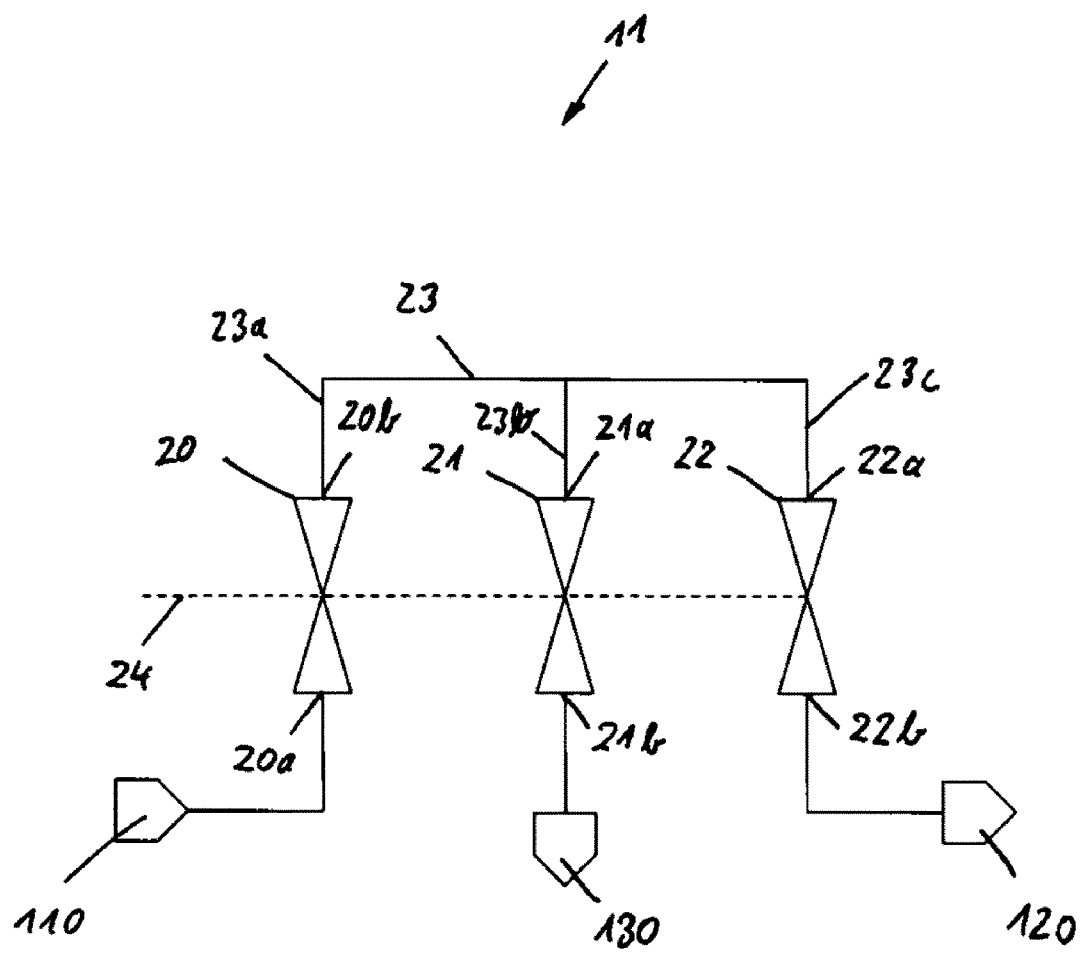
FIG. 2 shows a safety valve in a diagrammatic block illustration.
Figure 2A:
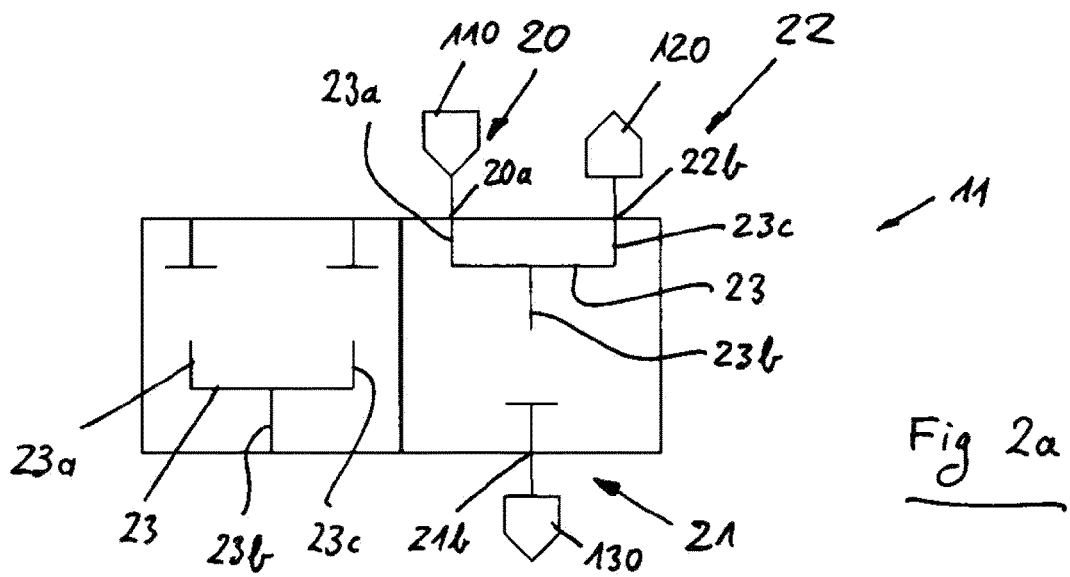
FIGS. 2a-2b show schematic circuit diagrams of the safety valve in accordance with FIG. 2 in two different switching positions.
Figure 2B:
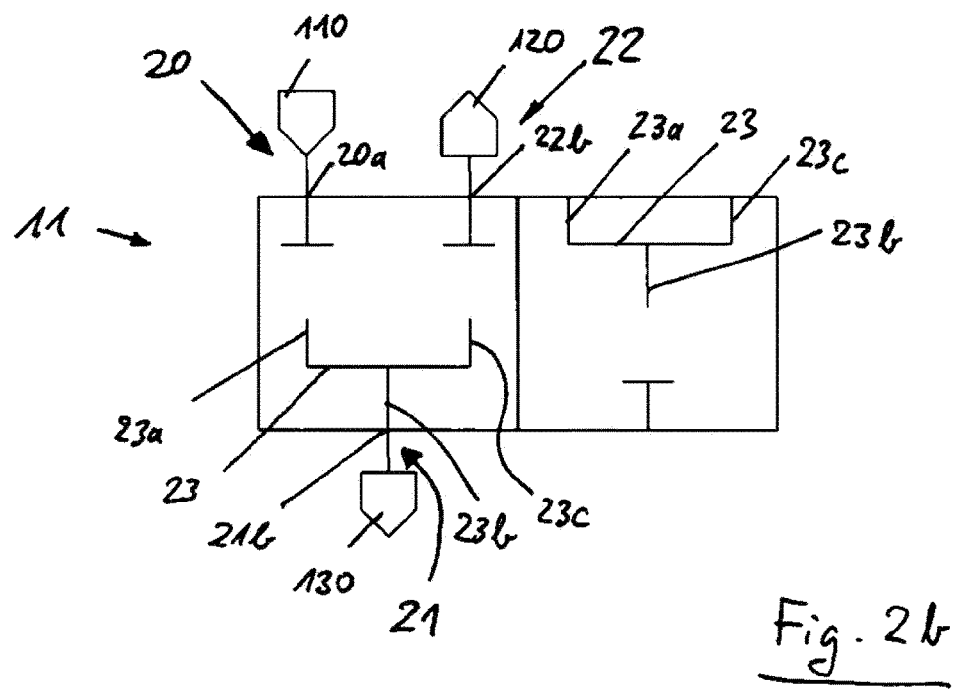

FIG. 1 shows a diagrammatic illustration of an exemplary use of a safety valve 11 according to the invention in an exemplary milking system 1. FIG. 2 shows a safety valve 11 in a diagrammatic block illustration. FIGS. 2a and 2b show schematic circuit diagrams of the safety valve 11 in accordance with FIG. 2 in two different switching positions.

Here, a teat 2 of an animal to be milked is shown in a representative manner for said animal. A teat cup 3, which is to be assigned to said teat 2, of a milking device (not shown; for example, of a milking robot) of the milking system 1 is arranged below this, which teat cup 3 is placed onto the teat 2 during a milking operation. In the case of an animal, for example a cow, there are usually four teats 2 which are in each case assigned a teat cup 3.

Each teat cup 3 is connected via a cup line 4 to two safety valve apparatuses, of which the one has four good milk valves 5 and the other has four bad milk valves 7. The good milk valves 5 are connected to a good milk line 6, and the bad milk valves 7 are connected to a bad milk line 8. The further routing of said lines is not to be discussed here. With regard to the construction and the function, reference is made to documents US 2012/0017836 A1 and WO 2010/053577 A1.

The two safety valve apparatuses serve to avoid accidental sucking of undesired media out of the bad milk line 8 or a "cleaning line" (here, the cup line 4 during a cleaning operation) into the good milk line 6.

The good milk valves 5 and the bad milk valves 7 of the safety valve apparatuses are configured as what are known as "block bleed block valves", the construction and function of which can be gathered from document US 2015/0173320 A1.

Furthermore, the teat cup 3 is connected via a feed line 9 to a cleaning device 10 (what are known as pre-dipping/post-dipping apparatuses) via a safety valve 11. Here, at least one safety valve 11 is provided per teat 2 or teat cup 3. Here, the cleaning device 10 comprises the safety valve 11, a dipping valve 12 with a dipping medium source 13, a water valve 14 with a water source 15, and an air valve 16 with a purging air source 17 and connecting lines 9, 18, 18a, 19. The dipping valve 12, the water valve 14 and the air valve 16 are also called media valves.

A maximum pressure of the media lies, for example, at 5 bar.

In the case of a dipping operation (for example, post-dipping), the dipping valve 12 opens for a defined time. In this time period, a dipping medium quantity is metered out of the dipping medium source 13. The air valve 16 opens, and the dipping medium which is then still situated in the feed line 9 which conducts the media to the teat cup 3 is conveyed with compressed air from the purging air source 17 to the teat 2 and is distributed through a nozzle on the teat 2.

In order to avoid dipping medium passing in an uncontrolled manner into the teat cup 3 as a result, for example, of a technical defect of the dipping valve 12, the safety valve 11 is provided between the media valves 12, 14, 16 and the teat cup 3. The safety valve 11 is open only during the dipping operation and during the cleaning of the system with water (from the water source 15 via the water valve 14), that is to say is in its open position which is also called the passage position. Otherwise, the safety valve 11 is closed, that is to say is in its closed position which is also called the block position.

A detailed description of the cleaning device 10 can be gathered from documents US 2012/0017836 A1 and WO 2010/053577 A1.

The safety valve 11 has an inlet connector 110, an outlet connector 120 and a bleed outlet connector 130. The inlet connector 110 is connected via an inlet line 19 to outlet lines 18, 18a of the media valves 12, 14 and 16.

The safety valve 11 is configured as what is known as "block bleed block valve" and comprises two block valves, namely a first block valve 20 and a second block valve 22, and a bleed valve 21. Depending on the flow direction of the medium which is flowing through, the first block valve 20 is called an inlet valve and the second block valve 22 is called an outlet valve or vice versa. Said three valves 20, 21 and 22 are connected to one another in such a way that the first block valve 20 and the second block valve 22 are connected in series in flow terms, the bleed valve 21 being connected to a common connection 23 of the first block valve 20 and the second block valve 22. In this way, the safety valve 11 is formed as "block bleed block valve".

The two block valves 20 and 22 and the bleed valve 21 are actuated by way of a common actuator 24 in such a way that, in one position, the safety valve 11 assumes what is known as a passage position, from which it can be adjusted into another position, what is known as a block position, and back again. This will be described in greater detail further below.

The first block valve 20 of the safety valve 11 is connected by way of an inlet 20a to the inlet connector 110. Therefore, the first block valve 20 of the safety valve 11 is connected via the inlet connector 110 to the inlet line 19 and via the outlet lines 18, 18a to the media valves 12, 14, 16.

Furthermore, an outlet 20b of the first block valve 20 is connected via a connecting connector 23a of the connection 23 and via a further connecting connector 23c of the connection 23 to an inlet 22a of the second block valve 22. An outlet 22b of the second block valve 22 is connected by way of the outlet connector 120 to the feed line 9 and therefore to the teat cup 3.

Moreover, the connection 23 communicates via yet a further connecting connector 23b with an inlet 21a of the bleed valve 21 which is connected by way of its outlet 21b to the bleed outlet connector 130 of the safety valve 11. The bleed outlet connector 130 can communicate with a separate container and/or with atmosphere.

The safety valve 11 has a function of a block bleed block valve. If the block valves 20 and 22 are open, the bleed valve 21 is closed. Said position is called the passage position of the safety valve 11 in the following text. In what is known as a block position of the safety valve 11, the block valves 20 and 22 are closed, the bleed valve 21 being open and connecting the bleed outlet connector 130 to the connection 23. This ensures in the block position that firstly the first block valve 20 completely blocks a throughflow of medium from the medium sources 13, 15, 17, and secondly the second block valve 22 shuts off the connection to the teat cup 3 via the feed line 9.

FIG. 2a shows a schematic circuit diagram of the safety valve 11 in the passage position. The schematic circuit diagram in accordance with FIG. 2b shows the block position of the safety valve 11.

The passage position is assumed in the case of cleaning operations (pre-dipping, post-dipping, water flushing), the block position being set in the case of milking operations. Moreover, the block position is always assumed as a safety position in the case of a non-activated drive of the safety valve 11. In other words, the safety valve 11 is in the block position when it is not driven.

Moreover, it is therefore ensured in the block position that, in the case of a possible leak of the first block valve 20 (for example, as a result of wear), medium from the medium sources 13, 15, 17 cannot pass into the intake line, configured as a cup line 4, of the safety valve apparatuses with the milk valves 5, 7, since the connection 23 of the safety valve 11 is connected by way of the open bleed valve 21 to the bleed outlet connector 130 (for example, to atmosphere or into a suitable collecting vessel).

Even in the case of a possible leak of the second block valve 22 in the block position, no medium from the medium sources 13, 15, 17 can be sucked in via the feed line 9 on account of the open bleed valve 21.

The safety valve 11 will be described in detail below.

Figure 3:
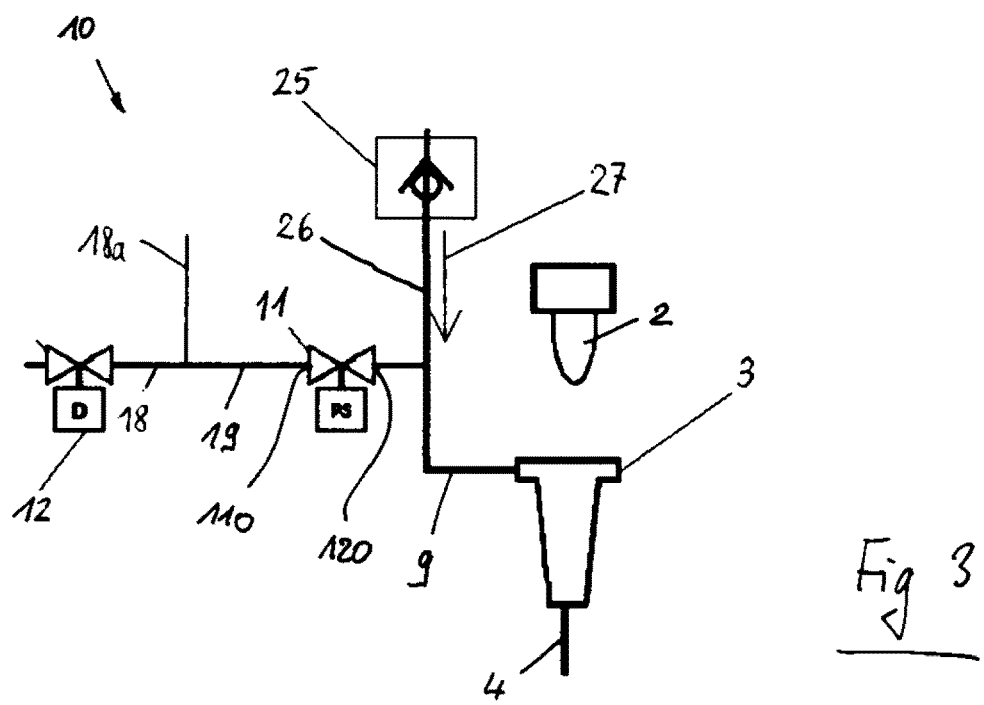
FIGS. 3-4 show diagrammatic block illustrations of the safety valve in accordance with FIG. 2 with a venting device.
Figure 4:
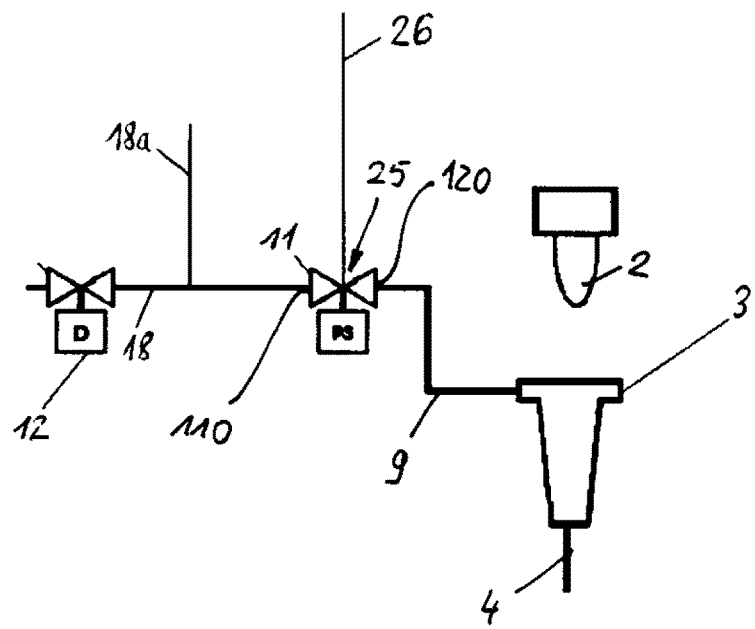
Figure 5:
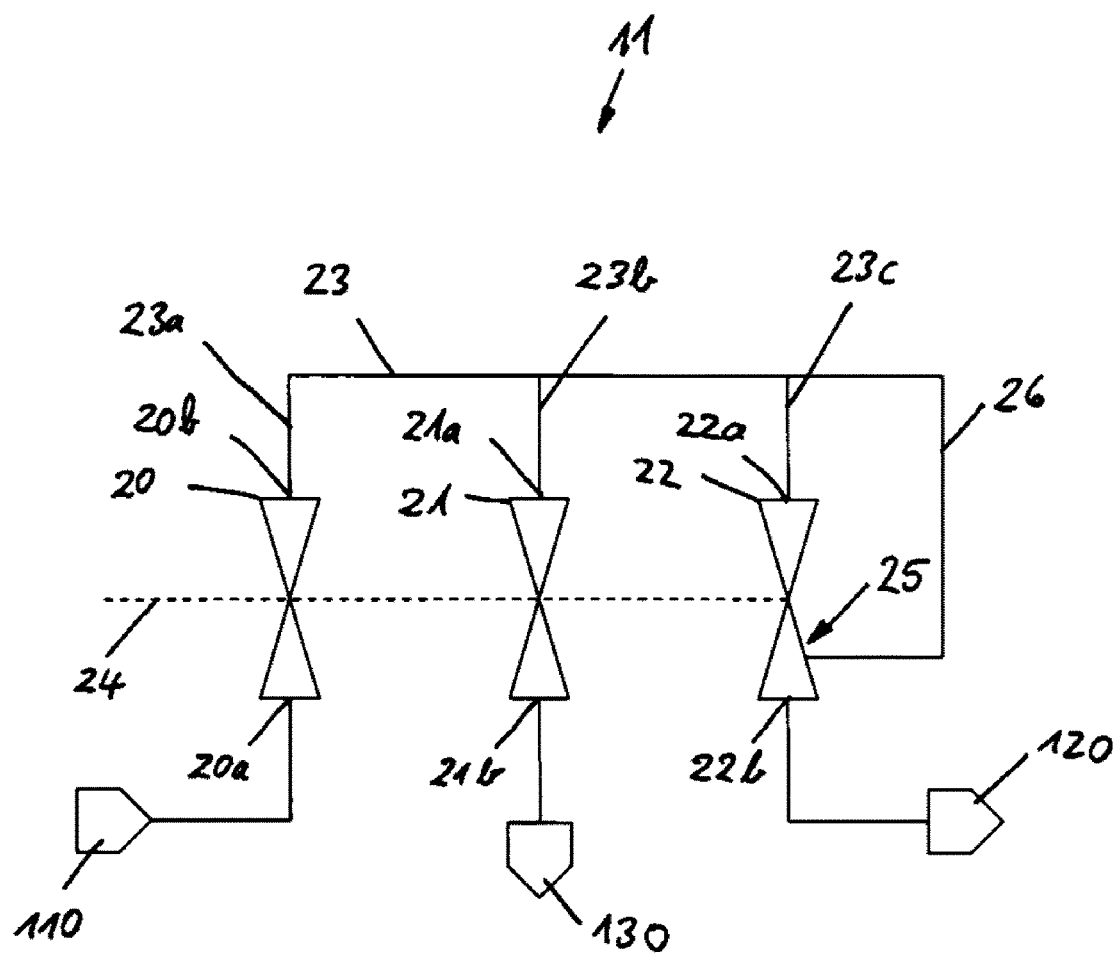
FIG. 5 shows the safety valve in accordance with FIG. 4 with a venting device in a diagrammatic block illustration.
Figure 5A:
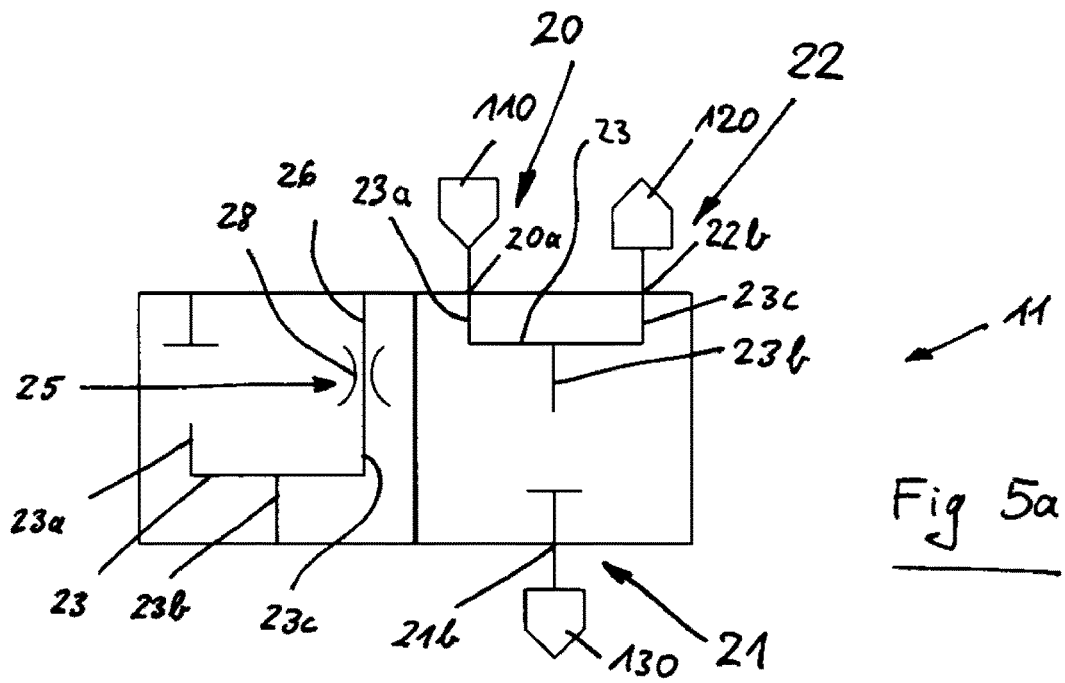
FIGS. 5a-5b show schematic circuit diagrams of the safety valve with the venting device in accordance with FIG. 5 in two different switching positions.
Figure 5B:
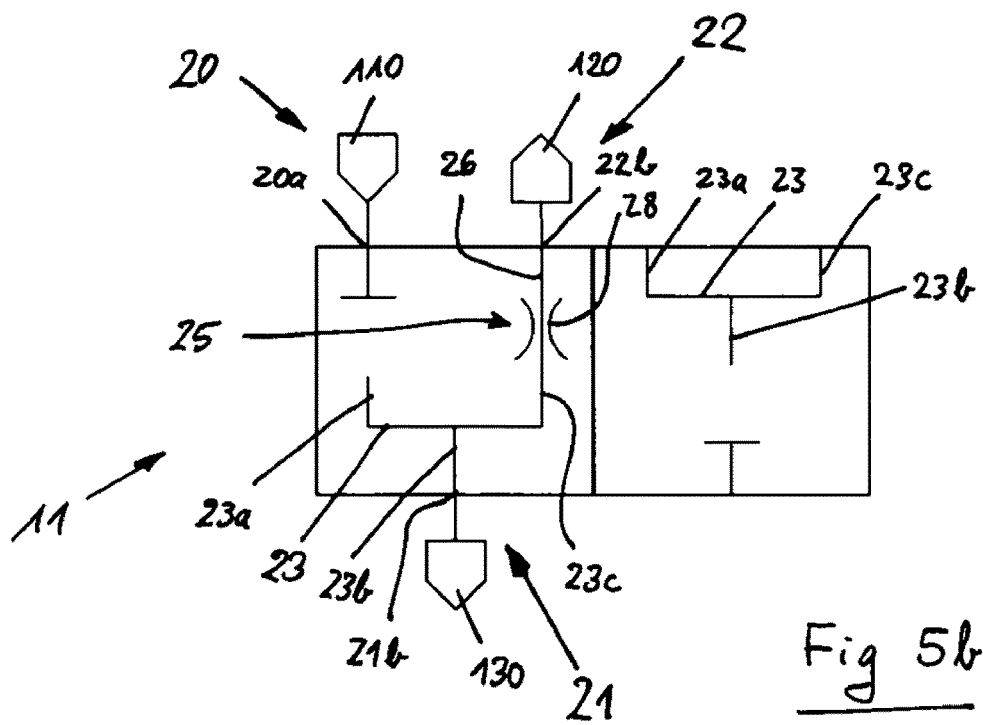

FIGS. 3-4 show diagrammatic block illustrations of the safety valve 11 in accordance with FIG. 2 with a venting device 25. FIG. 5 shows the safety valve 11 in accordance with FIG. 4 with the venting device 25 in a diagrammatic block illustration. In this regard, FIGS. 5*a*-5*b* show schematic circuit diagrams of the safety valve 11 with the venting device 25 in accordance with FIG. 5 in the different switching positions of passage position and block position.

The feed line 9 which leads from the outlet connector 120 of the safety valve 11 to the head of the teat cup 3 should be vented toward the head of the teat cup 3 during the milking operation. Venting of this type prevents penetration of liquid (milk, water and cleaning agent) into the feed line 9. FIG. 3 shows a venting device 25 which connects a venting line 26, which communicates with the feed line 9, to atmosphere. In this way, an air stream 27 is produced which is regulated by way of a small nozzle (cross-sectional limitation) in the venting device 25 in such a way that firstly no liquid can pass from the direction of the teat cup 3 into the feed line 9, and secondly a vacuum in the cup line 4 and in the teat cup 3 is not reduced excessively.

In the arrangement in accordance with FIG. 3, said venting is ensured by way of a check valve of the venting device 25, which check valve is installed, for example, in the venting line 26 between the safety valve 11 and the teat cup 3.

A further embodiment of a venting device 25 is shown in FIG. 4. Here, the venting device 25 is integrated into the safety valve 11, the venting line 26 communicating from the safety valve 11 to atmosphere.

The venting device in accordance with FIG. 4 is first of all shown diagrammatically in FIG. 5. As a basis, FIG. 5 has the safety valve 11 in accordance with FIG. 2, augmented by the venting device 25. Here, the venting device 25 is arranged in the second block valve 22 and is connected to the connection 23 via the venting line 26.

The passage position of the safety valve 11 with the venting device 25 in accordance with FIG. 5 is shown in FIG. 5*a* and corresponds to the passage position of the safety valve 11 in accordance with FIG. 2*a*. That is to say, the two block valves 20 and 22 are connected and open in series via the connection 23, the bleed valve 21 being closed.

In the block position of the safety valve 11 with the venting device 25 in accordance with FIG. 5, however, as can be seen clearly in FIG. 5*b*, the closed second block valve 22 is connected via the venting device 25 to the connection 23 and via the open bleed valve 21 to the bleed outlet connector 130. In this way, the feed line 9 which is connected to the outlet connector 120 (see FIG. 5) communicates via the venting line 26 with the connection 23 which for its part communicates with atmosphere via the bleed outlet connector 130 by way of the open bleed valve 21.

Here, the venting device 25 has a venting opening 28 with a small, defined cross section, as will be described below.

FIG. 6 shows one exemplary embodiment of the safety valve 11 in accordance with FIG. 5 in a longitudinal sectional view.

The safety valve 11 has a valve body 29 with a longitudinal axis 29*a*, which valve body 29 is constructed here from various functional units in a type of sandwich design. In said embodiment, the valve body 29 comprises a block valve unit 30, a bleed valve unit 31, a connecting unit 32, a bleed connector unit 33, a first drive unit 34 and a second drive unit 34'. In addition, the safety valve 11 has a piston rod 37 with a piston plate 40, a drive rod 43 and, in this embodiment, a sensor holder 36.

The block valve unit 30 is arranged centrally in the valve body 29. On its left hand side, it is connected to the bleed valve unit 31, the connecting unit 32 being arranged on the right hand side of the block valve plate 30. The bleed valve unit 31 is connected on its left hand side to the bleed connector unit 33. In turn, the first drive unit 34 is arranged on the connector unit 32 on its right hand side, the second connector unit 34' being attached on the left hand side of the bleed connector unit 33. The sensor holder 36 is fastened to the right hand side of the first drive unit 34. All units are connected to one another in a way which is not described in greater detail in order to form the valve body 29.

The bleed valve unit 31 is provided with a pressure chamber 31*a* on its side which points toward the block valve unit 30. Said pressure chamber 31*a* is a recess in the body of the bleed valve unit 31, which recess extends approximately over half the extent of the bleed valve unit 31 in the direction of a longitudinal axis of the safety valve 31. The pressure chamber 31*a* is thus fixed on the left hand side by a bottom in the bleed valve unit 31, by way of a circumferential wall of the bleed valve unit 31, and from the right hand open side by way of the block valve unit 30.

Together with the piston plate 40, the block valve unit 30 and the bleed valve unit 31 form the first block valve 20, the second block valve 22 and the bleed valve 21. A sealing bush 20*c* of the first block valve 20 and a sealing bush 22*c* of the second block valve 22 are inserted into the block valve unit 30, the longitudinal axes of the sealing bushes 20*c*, 22*c* running parallel to the longitudinal axis 29*a* of the safety valve 11. The sealing bushes 20*c*, 22*c* open in each case with a seat section 20*d*, 22*d* into the pressure chamber 31*a*. In this way, the pressure chamber 31*a* forms the connection 23 of the safety valve 11 as described above in conjunction with FIGS. 2, 2*a*, 2*b*, 5, 5*a* and 5*b*.

A sealing bush 21*c* of the bleed valve 21 is inserted into the bottom of the pressure chamber 31*a*. A longitudinal axis of the sealing bush 21*c* of the bleed valve 21 lies parallel to the longitudinal axes of the other sealing bushes 20*c*, 22*d* of the block valves 20, 22, and runs here in the longitudinal axis 29*a* of the safety valve 11. The sealing bush 21*c* of the bleed valve 21 likewise opens with a seat section 21*d* into the pressure chamber 31*a*.

The first block valve 20 is formed from the seat section 20*d* of the sealing bush 20*c* and a seat section face 40*b* of the piston plate 40, which seat section face 40*b* lies opposite the seat section 20*d*. The second block valve 22 is likewise formed from the seat section 22*d* of the sealing bush 22*c* and a seat section face 40*a* of the piston plate 40, which seat section face 40*a* lies opposite the seat section 22*d*. The seat section faces 40*a* and 40*b* of the piston plate 40 lie on that same side of the piston plate 40 which points toward the block valve unit 30.

That other side of the piston plate 40 which points toward the bleed valve unit 31 is also called the end side of the piston plate 40, and is provided with a further seat section face which is central here and, with the seat section 21*d* of the sealing bush 21*c* of the bleed valve 21, forms said bleed valve 21.

In this way, the safety valve 11 is configured as what is known as a seat valve.

Each sealing bush 20c, 21c, 22c has a bush flange which is not denoted here and forms an axial fixing means of the respective sealing bush 20c, 21c, 22c in the body of the associated functional unit 30, 31. Here, the bush flanges of the sealing bushes 20c, 22c of the block valves 20, 22 are arranged in such a way that they lie on that side of the block valve unit 30, on which the connector unit 32 is attached. The bush flange of the sealing bush 21c of the bleed valve 21 lies on that side of the bleed valve unit 31, on which the bleed connector unit 33 is attached, and projects from said side into an opening of the bleed connector unit 33, which opening communicates with the bush flange, in such a way that said engagement forms a centering means of the bleed connector unit 33 with the bleed valve unit 31.

The block valve unit 30 is also connected in a centered manner to the connector unit 32. To this end, the block valve unit 30 has a centering projection 30a on its side which points toward the connector unit 32, which centering projection 30a is received in a seal seat 32d of the connector unit 32, which seal seat 32d communicates with the centering projection 30a.

On its underside, the connector unit 32 has the inlet connector 110 of the safety valve 11. The inlet connector 110 is connected to a line 32a which is formed into the connector unit 32 in such a way that it runs parallel to the longitudinal axis 29a of the safety valve 11, extends to the left toward the block valve unit 30, and opens on the surface of that side of the connector unit 32 which points toward the block valve unit 30. The outlet connector 120 is arranged on the upper side of the connector unit 32 and is connected to a further line 32b which is likewise formed into the connector unit 32 parallel to the line 32a and opens on the surface of that side of the connector unit 32 which points toward the block valve unit 30.

By means of the centering means which is formed by the centering projection 30a and the seal seat 32d, the longitudinal axes of the sealing bushes 20c and 22c of the block valves 20 and 22 are aligned with the lines 32a and 32b which are assigned to them in each case. In this way, the sealing bush 20c of the first block valve 20 is connected via the line 32a to the inlet connector 110, the sealing bush 22c of the second block valve 22 communicating with the outlet connector 120 by way of the further line 32b.

A bleed chamber 33a is formed into the bleed connector unit 33 coaxially with respect to the longitudinal axis 29a of the safety valve 11 and with respect to the longitudinal axis of the sealing bush 21c of the bleed valve 21, the bleed chamber 33a extending to the left approximately over half the length of the bleed connector unit 33 in the longitudinal direction of the longitudinal axis 29a and being connected in a left hand third to a line 33a which runs downward at a right angle with respect to the longitudinal axis 29a. The line 33a connects the bleed chamber 33a and therefore the sealing bush 21c of the bleed valve 21 to the bleed outlet connector 130 which is arranged on the underside of the bleed connector unit 33.

The piston plate 40 is arranged in the pressure chamber 31a. The piston plate 40 is arranged such that it is guided displaceably in the direction of the longitudinal axis 29a by means of the piston rod 37. The piston plate 40 is connected fixedly in the center to a flange 39 which is formed at the left hand end of the piston rod 37, via a fastening element 41, a screw here, for example. Here, a seal 46 (see FIG. 7) is arranged between the piston plate 40 and the flange 39.

A recess 30c which corresponds with the flange 39 and merges toward the right into a smaller through opening 32b is formed into the block valve unit 30 in order to receive the flange 39 in the block position which will be described below.

The piston rod 37 has a longitudinal axis 37a which runs in the longitudinal axis 29a of the safety valve 11, and is mounted displaceably in a piston mount 32c of the connector unit 32. Here, the piston rod 37 extends from the flange 39 to the right, first of all through the through opening 32b of the block valve unit 30 into the seal seat 32d of the connector unit 32, and runs there through seals 45 (see FIG. 7) into the piston mount 32c of the connector unit 32, and through the latter as far as into a drive cylinder 38 of the first drive unit 34. The seals 45 are spaced apart in the longitudinal direction 29a by way of a sleeve 45a, as is apparent from FIG. 7.

A drive piston 38a is fastened to the right hand end of the piston rod 37, which drive piston 38a can be displaced in a piston chamber 34a in the longitudinal direction 37a of the piston rod 37 and likewise in the longitudinal direction 29a of the safety valve 11, and has piston seals (not denoted) with respect to the wall of the piston chamber 34a. The piston chamber 34a is connected via a line 34b to a drive connector 140. The drive cylinder 38 is driven via the drive connector 140 by way of a drive fluid, for example compressed air.

A maximum switching pressure for the drive unit 34 (and also for the further drive units described below) can lie, for example, at 5 bar.

The drive by means of the first drive unit 34 takes place only on one side, however, since this is a single-acting drive cylinder 38 with a compression spring which lies opposite. In other words, the drive fluid which is loaded with pressure presses the drive piston 38a and therefore the piston rod 37 with the piston plate 40 to the left in the direction of the longitudinal axis 29a against a force accumulator element 42a of a drive cylinder 38' of the second drive unit 34'. If the first drive unit 34 is then released, for example by way of a reduction of the pressure of the drive fluid, the force which is stored in the force accumulator element 42a is used, in order to move the piston plate 40 with the piston rod 37 and the drive pistons 38a back into its starting position again.

The second drive unit 34' has a central seat 35, into which a cylinder liner 42 of the drive cylinder 38' is inserted. The force accumulator element 42a (here, a compression spring) is arranged in the cylinder liner 42. The force accumulator element 42a is supported with its left hand end on a bottom of the cylinder liner 42. The other end of the force accumulator element 42a is in contact with a flange 43a of a drive rod 43. The drive rod 43 extends to the right in the direction of the piston plate 40 through a rod mount 33c of the bleed connector unit 33, through the bleed chamber 33a, and through the sealing bush 21c of the bleed valve 21. The right hand end of the drive rod 43 is in contact with the piston plate 40. In addition, the drive rod 43 runs through a seal 44 which is arranged at the right hand end of the cylinder liner 42 and also forms a centering means between the second drive unit 34' and the bleed connector unit 33 by way of a projection (not denoted here) which projects with respect to the bleed connector plate 33.

The cylinder liner 42, the force accumulator element 42a and the drive rod 43 of the second drive unit 34' have a center axis which lies in the longitudinal axis 29a of the safety valve 11 and in the piston axis 37a of the piston rod 37 of the first drive unit 34.

FIG. 6 shows the safety valve 11 for improved clarity in a transition position between the block position and the passage position. Here, the piston plate 40 is situated approximately in the center of the pressure chamber 31a in relation to the longitudinal axis 29a.

In the block position of the safety valve 11, the piston plate 40 is pressed with its seat section faces 40a and 40b against the respective seat sections 20d and 22d of the block valves 20 and 22 by way of the second drive unit 34', that is to say by way of a prestressing force of the force accumulator element 42a, as a result of which said block valves 20 and 22 are closed. The other seat section face 40c of the bleed valve 21 is lifted up from the associated seat section 21d of the sealing bush 21c of the bleed valve 21, as a result of which the bleed valve 21 is open. The pressure chamber 31a is thus connected by way of the open bleed valve 21 via the bleed chamber 33a and the line 33b to the bleed outlet connector 130 and then, for example, to atmosphere.

By way of activation of the first drive unit 34, the piston plate 40 is adjusted, as described briefly above, to the left counter to the prestressing force of the force accumulator element 42a of the second drive unit 34' in the direction of the longitudinal axis 29a of the safety valve 11, to such an extent that that side of the piston plate 40 which points toward the bleed valve unit 31 presses with its seat section face 40c against the seat section 21d of the sealing bush 21c of the bleed valve 21 and therefore closes the bleed valve 21. In this way, the passage position of the safety valve 11 is assumed. The other side of the piston plate 40 is lifted up with its seat section faces 40a and 40b from the seat sections 20d and 22d of the block valves 20 and 22. In this way, the block valves 20 and 22 are open and can communicate with one another via the pressure chamber 31a, as a result of which the inlet connector 110 and the outlet connector 120 are connected in the passage position.

A lift of the piston plate 40 during the adjustment from the block position into the passage position is approximately 3 mm in this exemplary embodiment, in contrast to the customary 5 mm.

In a further refinement, the safety valve 11 has the venting device 25 in accordance with FIGS. 5, 5a-5b. For the sake of clarity, the venting device 25 with its components is provided with designations for the first time in FIG. 7, but will already be described in the following text.

In this exemplary embodiment, the venting device 25 comprises a venting opening 28 which is connected to a cone 28a. The venting opening 28 is a cylindrical bore with a small diameter which corresponds here approximately to one fifth of the dimension of the piston plate 40 in the longitudinal direction 29a. Here, a length of the venting opening 28 corresponds approximately to three tenths of the dimension of the piston plate 40 in the longitudinal direction 29a. The venting opening 28 extends from that side of the piston plate 40 which points toward the bleed valve unit 31, parallel to the longitudinal axis 29a in the direction of the block valve unit 30, and then merges into the cone 28a which opens on that side of the piston plate 40 which points toward the block valve unit 30 with a diameter which corresponds approximately to the dimension of the piston plate 40 in the longitudinal direction 29a. Said dimensions can of course also have different values.

The venting device 25 is arranged in the piston plate 40 in such a way that the opening of the cone 28a lies within the seat section face 40a. This means that the venting device 25 opens with the cone 28a into the sealing bush 22c of the second block valve 22 in the block position. For this purpose, it is necessary that the piston plate 40 is arranged such that it cannot rotate about the piston axis 37a, in order that the cone 28a of the venting device 25 cannot be moved.

For this purpose, for example, the piston plate 40 can be guided such that it cannot rotate by way of an oval shape in the pressure chamber 31a which is shaped in a corresponding manner with respect to said oval shape. In another embodiment, for example, the flange 39 and the recess 30c which communicates with it in the block valve unit 30 can have an oval anti-rotation shape or an anti-rotation shape which differs from a circular shape. It is also possible that a pin is provided as a guide and an anti-rotation safeguard. Thus, for example, the piston rod 37 and/or the drive piston 38 can also have a corresponding anti-rotation safeguard in terms of shape or, for example, a pin guide.

An anti-rotation safeguard of this type of the piston plate 40 including the drive piston 38a is advantageous in relation to a sensor 47, which will be explained in greater detail below.

FIGS. 7 and 8 show diagrammatic sectional views of variants of the exemplary embodiment in accordance with FIG. 6.

The variant in accordance with FIG. 7 shows an embodiment with two single-acting drive cylinders 38 and 38'. Here, the second drive cylinder 38' is constructed in the same way as the first drive cylinder 38 (the designations of the components are provided with a prime), and is situated in a second drive unit 34' which is attached on the left hand side on the bleed connector unit 33 instead of the second drive unit 34' of the embodiment in accordance with FIG. 6 with the force accumulator element 42a. The other construction of the safety valve 11 corresponds to the exemplary embodiment in accordance with FIG. 6 and is therefore not repeated.

In the variant in accordance with FIG. 8, the safety valve 11 is equipped with a drive unit 34" with a double-acting drive cylinder 38, and therefore has a shortened length in the longitudinal direction 29a in comparison with the previous exemplary embodiments.

The drive unit 34" has two drive connectors 140, 140' which are arranged on opposite sides of the drive unit 34". The drive connector 140 serves to load the drive cylinder 38 with drive fluid for moving the safety valve 11 into the passage position, whereas the second drive connector 140' serves to load the drive cylinder 38 from the other side of the double-acting drive piston 38a with drive fluid for moving the safety valve 11 into the block position.

A bleed connector unit 33 as in the preceding examples is not shown here, but can be attached optionally.

Figure 9:
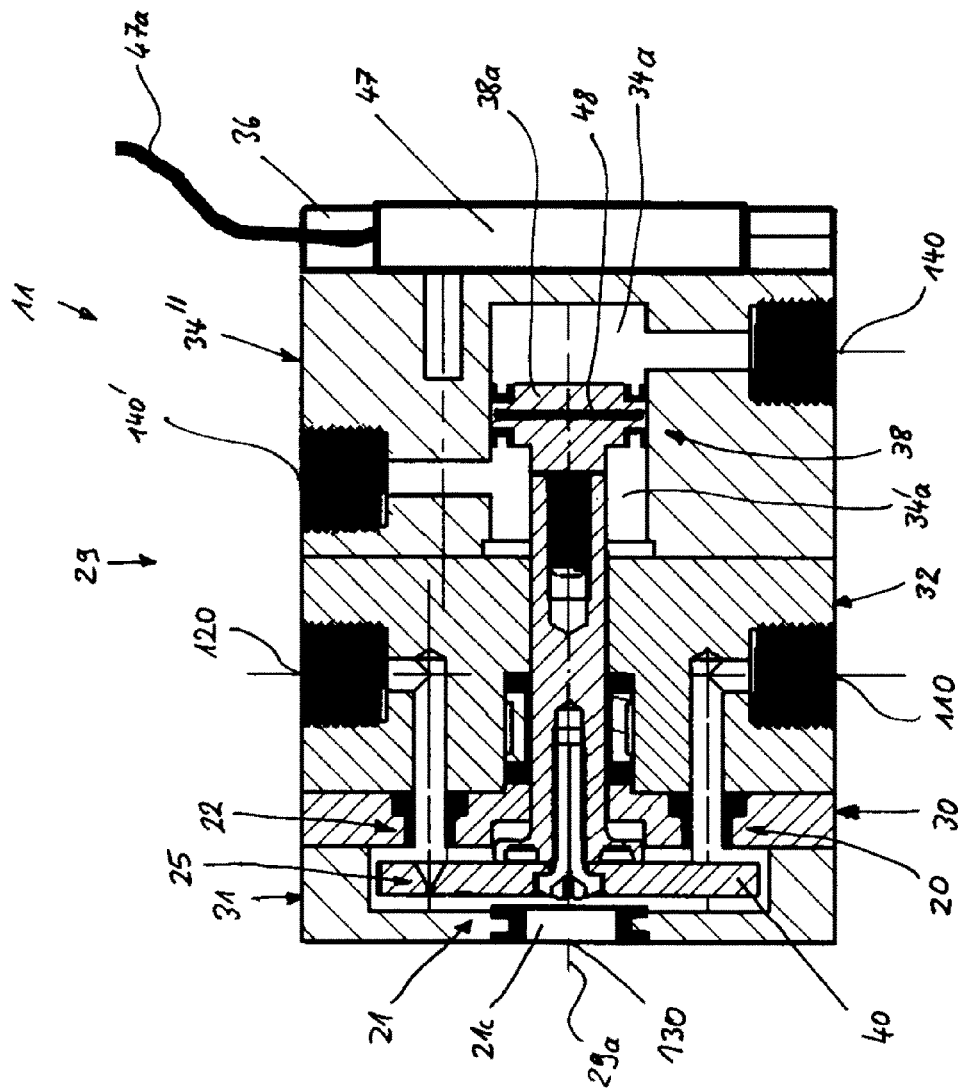
FIG. 9 shows a diagrammatic sectional view of the variant in accordance with FIG. 8 with a sensor.

FIG. 9 shows a diagrammatic sectional view of the variant in accordance with FIG. 8 with a sensor 47.

The sensor 47 is, for example, a magnetically actuable sensor, such as a reed contact, has an electric connector in the form of a sensor line 47a, and is attached in the sensor holder 36 on the right hand outer side of the drive unit 34". Here, the sensor actuating element 48 which is required with respect to the sensor 47 is configured as a permanent magnet and is arranged in the drive piston 38a.

The sensor 47 serves to monitor the position of the safety valve 11 and here, in particular, to determine the block position of the safety valve 11, which block position is also called the safety position.

In order to retain a hysteresis of the sensor 47 in an unchanging manner, the anti-rotation safeguard of the drive piston 38a which has already been mentioned and described above is of particular advantage.

Finally, FIG. 10 shows a diagrammatic perspective view of the exemplary embodiment of the safety valve 11 in accordance with FIG. 6. It can be seen clearly here that the individual functional units 30, 31, 32, 33, 34 and 34' are configured in a block form, which is not absolutely necessary, however.

The materials which are used have to be resistant with respect to the dipping media which are used, and additionally have to comply with national regulations depending on the national use (for example, FDA in the USA). The materials are, inter alia, PA, PPSA, PA12, XF, FKM and the like. In particular, a resistance with respect to the constituent parts iodine, glycerin, chlorhexidine and $H_2O_2$ is required.

The above-described exemplary embodiments do not restrict the invention. The invention can be modified within the scope of the appended claims.

It is thus conceivable, for example, that the venting device 25 with the venting opening 28 and the cone 28a is configured as a separate insert part and can be used in different embodiments. An adjustability is also possible.

Moreover, it is conceivable that the sealing bushes 20d, 22d, 21d are replaceable. In addition, they can be of different configuration for different uses.

In another embodiment, the pressure chamber 31a can have an even smaller volume. As a result, a higher precision of the dipping quantity can be achieved. The safety valve 11 can therefore also be used in another application as a metering valve.

The piston plate 40 can also be provided in a two-component material configuration in its seat section faces 40a, 40b, 40c.

The drive units 34, 34', 34" can of course also have different drive types than pressurized drive fluids, such as an electromagnet, an electric motor, a piezo drive and the like.

In addition, it is also conceivable that, instead of the cone 28a, a stepped bore is provided which is configured as a circular cylinder, for example with the diameter which the cone 28a has at its opening in the seat section face 40a of the piston plate 40.

The invention claimed is:

1. A safety valve for a cleaning apparatus for a milking system for milking milk-producing animals, the safety valve comprising:
    a first block seat valve with an inlet connector;
    a second block seat valve with an outlet connector;
    a bleed seat valve with a bleed outlet connector;
    a piston rod;
    a driver operatively engaged with the piston rod; and
    a piston plate operatively engaged with the piston rod, and the piston plate is moveable between a block position, in which the first block seat valve is closed to block the inlet connector and the second block seat valve is in a closed position to block the outlet connector from the inlet connector, and the bleed seat valve is open for connecting the bleed outlet connector to a connection, and a passage position, in which the first block seat valve and the second block seat valve are open for connecting the inlet connector via the connection to the outlet connector, and the bleed seat valve is closed for blocking the bleed outlet connector.

2. The safety valve of claim 1, wherein the piston plate has a first seat section face corresponding with the first block seat valve, and a second seat section face corresponding with the bleed seat valve.

3. The safety valve of claim 1, wherein the piston plate has a first side coupled with the piston rod and a second side, and the safety valve further comprises a second driver having a drive rod operatively engaged with the second side.

4. The safety valve of claim 1, wherein the driver includes a drive cylinder engaged with a drive piston, and the safety valve further comprises a second driver including a force accumulator element which biases the piston plate toward the block position for closing the first block seat valve and the second block seat valve.

5. The safety valve of claim 1, and further comprising a second driver, and wherein the driver and the second driver each have a drive cylinder.

6. The safety valve of claim 1, wherein the driver includes a double-acting drive cylinder.

7. The safety valve of claim 1, wherein the safety valve further comprises:
    a valve body with a longitudinal axis and the valve body includes a first block valve unit, a bleed valve unit, a connecting unit, and the driver.

8. The safety valve of claim 1, wherein the connection defines a pressure chamber between the first block seat valve and the bleed seat valve and, the piston plate is disposed at least partially in the pressure chamber for movement between the passage position and the block position.

9. The safety valve of claim 1, wherein the connection defines a pressure chamber and, when the safety valve is in the block position, the first block seat valve is closed and the second block seat valve is in the closed position for blocking the inlet connector and the outlet connector by way of one side of the piston plate, and the bleed seat valve connects the bleed outlet connector to the pressure chamber.

10. The safety valve of claim 1, wherein the connection defines a pressure chamber and, when the safety valve is in the passage position, the first block seat valve and the second block seat valve communicate by way of the pressure chamber for connecting the inlet connector to the outlet connector, and the bleed seat valve is closed for blocking the bleed outlet connector by a second side of the piston plate.

11. The safety valve of claim 1, wherein the first block seat valve, the second block seat valve, and the bleed seat valve each include a sealing bush within a seat section, and each seat section interacts with a corresponding seat section face of the piston plate.

12. The safety valve of claim 1, and further comprising:
    a vent in communication with the outlet connector of the second block seat valve.

13. The safety valve of claim 1, wherein the piston plate defines a venting opening and the venting opening comprises:
    a cone.

14. The safety valve of claim 1, and further comprising:
    a drive piston, and wherein the piston plate and the drive piston do not rotate relative to a piston axis of the drive piston.

15. The safety valve of claim 14, wherein the piston plate shape prevents rotation of the piston plate about the piston axis.

16. The safety valve of claim 1, and further comprising:
    a flange joined to the piston rod and the flange is joined to a recess defined by the piston plate.

17. The safety valve of claim 1, and further comprises:
    a pin guide engaged with the piston plate.

18. The safety valve of claim 1, and further comprising:
    a drive piston operatively engaged with the piston plate; and
    a valve position sensor.

19. The safety valve of claim 18, wherein the valve position sensor interacts with a sensor actuator operatively engaged with the drive piston.

20. The safety valve of claim 19, wherein the sensor actuator includes a magnet.

21. The safety valve of claim 14, wherein the drive piston shape prevents rotation of the drive piston about the piston axis.

\* \* \* \* \*